(12) United States Patent
Shoji et al.

(10) Patent No.: US 8,898,802 B2
(45) Date of Patent: Nov. 25, 2014

(54) ELECTRONIC COMPUTER DATA MANAGEMENT METHOD, PROGRAM, AND RECORDING MEDIUM

(75) Inventors: Koichiro Shoji, Zama (JP); Takashi Nozaki, Zama (JP)

(73) Assignee: Science Park Corporation, Zama-shi (JP)

( * ) Notice: Subject to any disclaimer, the term of this patent is extended or adjusted under 35 U.S.C. 154(b) by 1416 days.

(21) Appl. No.: 12/091,246

(22) PCT Filed: Oct. 24, 2006

(86) PCT No.: PCT/JP2006/321185
§ 371 (c)(1),
(2), (4) Date: Mar. 2, 2009

(87) PCT Pub. No.: WO2007/049625
PCT Pub. Date: Mar. 5, 2007

(65) Prior Publication Data
US 2009/0193524 A1    Jul. 30, 2009

(30) Foreign Application Priority Data

Oct. 24, 2005 (JP) ................. 2005-309155

(51) Int. Cl.
G06F 21/22 (2006.01)
G06F 21/62 (2013.01)
G06F 21/10 (2013.01)
G06F 21/53 (2013.01)
G06F 21/78 (2013.01)
G11B 20/00 (2006.01)

(52) U.S. Cl.
CPC ............. *G06F 21/62* (2013.01); *G06F 21/10* (2013.01); *G06F 21/53* (2013.01); *G06F 21/78* (2013.01); *G11B 20/00086* (2013.01)

USPC ........ 726/27; 726/2; 726/16; 726/17; 726/18; 726/26; 713/182

(58) Field of Classification Search
CPC ................................. G06F 21/62; G06F 21/78
USPC .................... 726/2, 16–18, 26–27; 713/182
See application file for complete search history.

(56) References Cited

U.S. PATENT DOCUMENTS 7,047,557 B2 *  5/2006  Enomoto .................... 726/1
7,240,364 B1 *  7/2007  Branscomb et al. ........... 726/9

(Continued)

FOREIGN PATENT DOCUMENTS

EP         1489516      * 12/2004
JP     2004-318720 A     11/2004

(Continued)

OTHER PUBLICATIONS

International Search Report of PCT/JP2006/321185, date of mailing Feb. 13, 2007.

*Primary Examiner* — Yin-Chen Shaw
(74) *Attorney, Agent, or Firm* — Westerman, Hattori, Daniels & Adrian, LLP

(57) ABSTRACT

The present invention provides a data management program for performing monitoring so that user data provided to the client cannot be copied and utilized for a purpose other than the intended purpose.
When a storage device (8) storing user data (3) is connected to a client computer (12), a management program (4) prohibits writing to all of the external storage devices. The management program (8) makes settings prohibiting usage of a network (7). The management program (4) performs control by acquiring the file name, folder name, and attribute data of the execution file as well as the process name and process ID of the process being executed. The management program (4) has built-in driverware (50) which runs in the kernel mode (15) of an operating system (21) and serves to provide a common interface for the communication of device drivers (35, 36, 42 to 44) and an application program (20).

16 Claims, 15 Drawing Sheets

(56) References Cited

U.S. PATENT DOCUMENTS

| | | | |
|---|---|---|---|
| 7,263,590 B1* | 8/2007 | Todd et al. | 711/165 |
| 7,555,757 B2* | 6/2009 | Smith et al. | 719/328 |
| 2003/0014466 A1* | 1/2003 | Berger et al. | 709/102 |
| 2005/0120359 A1 | 6/2005 | Shoji et al. | |
| 2005/0138433 A1* | 6/2005 | Linetsky | 713/202 |
| 2006/0193467 A1* | 8/2006 | Levin | 379/413.04 |
| 2009/0193524 A1* | 7/2009 | Shoji et al. | 726/27 |

FOREIGN PATENT DOCUMENTS

| | | |
|---|---|---|
| JP | 2005-275669 A | 10/2005 |
| WO | 03/073289 A1 | 9/2003 |

\* cited by examiner

PROCESS CONTROL LIST

ELECTRONIC COMPUTER DATA MANAGEMENT METHOD, PROGRAM, AND RECORDING MEDIUM

TECHNICAL FIELD

The present invention relates to an electronic data management system for managing electronic data and, more particularly, to an electronic computer data management method, program, and recording medium for data traceability for tracking and monitoring access to files in which electronic data are stored.

BACKGROUND ART

Personal information and business know-how are often saved in the storage device and recording medium of a computer as files in an electronic data format. It is important to acquire and strictly manage the history of access to the files, in particular, the history of the monitoring, editing, copying, printing, and transmission of the files. For example, an insurance company distributes restoration manuals to authorized personnel in the event of a disaster. The restoration manual is a collection of know-how and has an extremely high information value. The leakage or copying of the restoration manuals which are distributed offline is therefore undesirable.

In addition, manufacturers distribute product specifications and designs to authorized personnel. It is desirable to avoid leaking product specifications and designs which are confidential information to the outside so that the product specifications and designs are not seen by parties other than the authorized personnel. During the proofreading of publications or the like, the original electronic data are changed, and it is desirable to avoid leaking the original or proofread electronic data to the outside. It is likewise desirable to avoid leaking the original or edited electronic data such as photograph image data or other image data.

In order to meet such needs, management systems which manage files which have been saved in electronic data format have conventionally been proposed in the form of a variety of systems. For example, Patent Document 1 discloses a document total management system which comprehensively implements the confidentiality of print data which are sent and received via a network system and improves the traceability of printed document data.

The document integrated management system is comprising a document management server which performs authentication of an administrator with access rights, the setting of access rights, and the authentication of users who access documents and holds document management information; a printer server which is an information processing device such as a PC that is used by a user, and performs authentication in cases where the user designates document printing together with authentication of the user and performs the generation of a print watermark and management of a print log; and a printer which performs authentication of the recipient of printed matter and prints documents which are sent by the printer server. The document integrated management system further comprises a copy server which manages the copy logs and manages the copy watermarks, and manages copy documents, and a copier which extracts the watermarks, authenticates the person doing the copying, and copies documents.

[Patent Document 1] Japanese Patent Application Laid-Open No. 2004-280227

A user often records user data on a portable storage device or recording medium and supplies same to their client. Having received the user data, the client generally performs work by utilizing the user data and returns the work results and the portable storage device or recording medium to the user.

However, the client is able to freely copy and edit the user data recorded on the portable storage device or recording medium. The prevention of copying of the user data recorded on the portable storage device or recording medium to parties other than authorized personnel and the management of the user data are important to the user.

DISCLOSURE OF THE INVENTION

Such data management is not mentioned in the Patent Document above.

The present invention was conceived on the basis of the abovementioned technical background and achieves the following objects.

An object of the present invention is to provide an electronic computer data management method, program, and recording medium for tracking and monitoring access to user data which are provided to a client.

A further object of the present invention is to provide an electronic computer data management method, program, and recording medium for managing user data which are provided to a client so that the user data cannot be utilized for a purpose other than the intended purpose.

Yet another object of the present invention is to provide an electronic computer data management method, program, and recording medium for preventing the copying of user data which are provided to a client so that the user data cannot be utilized for a purpose other than the intended purpose.

The present invention adopts the following means in order to achieve the above objects.

The present invention serves to manage electronic data when electronic data are monitored or edited on an electronic computer. The present invention provides an electronic computer data management method for tracking and monitoring access to the electronic data when work is performed on the electronic computer by utilizing the electronic data. With the electronic computer data management method, the delivery of electronic data on an electronic computer to an external storage device by recording of the electronic data on the external storage device is managed by controlling the I/O device of the electronic computer. The external storage device referred to here signifies a storage device which is built into the electronic computer or which operates by being connected thereto.

For example, the storage device is a hard disk driver which is built into the electronic computer, an external hard disk driver which operates by being connected to the electronic computer, or a flash memory connected to the electronic computer for storing data, or the like. The storage device which operates by being connected via a network to the electronic computer is also treated as an external storage device. Electronic data are recorded in a dedicated recording device for recording the electronic data and is delivered to the outside by an electronic computer. The user is able to record electronic data in the dedicated recording device, transfer same to another user, or connect the dedicated recording device to another electronic computer and edit the electronic data.

The data management method is implemented by a computer program. The present invention supplies an electronic computer data management program for performing the management of electronic data which is run on an electronic computer. The data management program is a computer program which causes the electronic computer to run. The present invention controls the I/O device of the electronic computer, the internal storage device, the external storage device connected to the electronic computer, another device which is connected to the electronic computer, and a network-related device of the electronic computer, or the like by means of the data management program. The present invention specifies an application program which performs read and write access with respect to the recording medium storing the user electronic data as well as the process of the application program, and establishes same as the control target. The present invention also provides a recording medium which records the data management program.

Means as a Whole

The means for achieving the above object will subsequently be described in detail. The electronic computer of the present invention has built-in driverware means (described subsequently). The electronic computer is operated by an operating system. The operating system possesses a kernel mode in which all the commands can be executed and a user mode which provides an interface for the user. When the operating system runs in user mode, only a portion of the commands provided by the operating system can be executed. Kernel mode causes all the commands to be executed and does not limit the execution processes in any way. Devices inside the electronic computer and external devices which are connected to the electronic computer are mostly controlled in this kernel mode.

Driverware Means

The electronic computer of the present invention comprises driverware means which serves to provide a common interface for communications between device drivers for directly controlling devices which are connected to the electronic computer or for communications between the device drivers and application programs which run on the electronic computer. The driverware means specifically comprises an application program interface section, a device driver control unit, and a control unit. The application program interface section receives first data including commands and/or data which are output by the application program running on the electronic computer.

In addition, the application program interface section transmits second data including execution results for these commands and/or reception data which are received from the device driver of the electronic computer to the application program. The device driver control unit transmits third data including the above commands and/or data to the device driver of the electronic computer and receives the execution results and receives fourth data including the execution results for these commands and/or reception data from the device driver. The control unit processes the first data or the fourth data, generates the second data or the third data, and performs control of the first to fourth data.

A process control list, which determines the permission or denial of reading from an external storage device which is built into or connected to the electronic computer or of writing to the external storage device based on the execution file of the application program executed by the electronic computer or the process of the execution file, is created. When the storage device for storing user data is connected to the electronic computer, the driverware means makes settings to completely deny access for reading from the external storage device including the storage device or for writing to the external storage device. Such settings enable the driverware means to turn the control mode ON.

The driverware means specifies an application program which is performing access to read from and write to a recording medium on which user electronic data are stored as well as the process of the application program, and makes same the control target. Furthermore, when the application program is started up, the driverware means acquires one or more control data which are selected from among the file name of the execution file, the file path of the execution file, the process name of the process, and the process ID of the process. The driverware means compares the acquired control data with the values of the process control list and permits or denies reading from an external storage device which is built into or connected to the electronic computer or writing to the external storage device.

In cases where the control data match the values of the process control list, the driverware means grants or denies permission in accordance with the process control list. In cases where the control data do not match the values of the process control list, the driverware means always denies permission.

The driverware means acquires the process name or process ID by means of the application program interface section.

The Control Mode

When the control mode is turned ON, the driverware means makes one or more settings to prohibit usage of one or more communication ports which are selected from the group consisting of RS-232C, IrDA, USB, and IEEE1394 (whose other name is FireWire) which are serial interfaces for a serial transfer system and IEEE1284, SCSI, and IDE which are parallel interfaces for a parallel transfer system, to prohibit the copy and paste function, prohibit usage of screen capture, prohibit usage of the clipboard, and prohibit the network function.

When the storage device which stores the user data is disconnected from the electronic computer, the driverware means turns the control mode OFF by canceling all of the settings which are made when the control mode is ON.

Constitution and Function of the Storage Device

The storage device comprises a user area which is an area for storing user data and which permits reading and writing and a control means area dedicated to reading which is an area for storing the control means.

When the storage device is connected to the electronic computer, the dedicated control means which is stored in the control means area automatically operates and, after checking the driverware means, transmits a command to turn ON the control mode of the driverware means to the driverware means. When the control mode of the driverware means is turned ON, the dedicated control means causes the operating system to recognize the user area, thereby establishing a state where the user data can be accessed by the electronic computer.

The storage device can comprise a switch that switches between the control means area and the user area. In this case, the dedicated control means performs switching of the switch. More specifically, when the control mode of the driverware means has been turned ON, the dedicated control means switches the switch in the storage device from the control means area to the user area and a state where the user data can be accessed by the electronic computer is assumed. Here, the operating system is made to recognize the user area so that the user data can be accessed by the electronic computer.

The storage device can comprise an authentication section for individually authenticating a client using the storage device.

Log Authentication Section, Encryption Section, and Decoding Section

The driverware means can comprise an encryption section for encrypting user data and a decoding section for decoding the encrypted user data.

The driverware is able to comprise a log acquisition section in order to acquire control data or the history of the control.

Acquisition of Control Data

The driverware means may acquire the process name or the process ID by means of the following method.

Acquisition of Control Data by Application Platform Means

Application platform means which operates in the user mode of the operating system and serves to provide a user interface with the file system of the operating system may cause the process to operate in a suspend mode in a state where the process is temporarily halted, thereby acquire the process name and process ID, and transmit the process name and process ID to the application program interface section.

Acquisition of Control Data by Control Unit

An access request for access by the application program to an external storage device may be received by the device driver control unit for controlling the file system driver which is a device driver for the file system of the operating system and the access request thus received may be transmitted to the control unit. The control unit may receive the access request, acquire control data from the access request, and transmit the control data thus acquired to the device driver control unit.

The device driver control unit receives control data and compares the control data thus received with the values of the process control list. The device driver control unit may permit or deny access in accordance with the process control list in cases where the control data match the values of the process control list, and may permit access in cases where the control data do not match the values of the process control list.

Data Management Program

The present invention provides an electronic computer data management program for managing electronic data which are running on the electronic computer. The data management program is a computer program for causing an electronic computer to run and operates as follows. The electronic computer data management program of the present invention comprises a driverware program for performing management of electronic data which operates on the electronic computer. The driverware program operates in kernel mode in which all of the commands of the operating system operating the electronic computer are executed and is a program which serves to provide a common interface for the communications of device drivers for directly controlling devices which are connected to the electronic device or for communications between the device drivers and application programs which run on the electronic computer.

Driverware Program

The driverware program comprises an application program interface section, a device driver control unit, and a control unit. The application program interface section serves to provide an interface for the driverware program and the application program. More specifically, the application program interface section receives first data including a command and/or data which are output by the application program and transmits second data including the command execution result and/or reception data which are received from the device driver to the application program.

The device driver control unit serves to provide an interface between the driverware program and the device driver of the electronic computer. More specifically, the device driver control unit transmits third data including the command and/or the data to the device driver and receives fourth data including the execution result for the command and/or the reception data from the device driver. The control unit serves to control the processing data of the driverware program. The control unit processes the first data or the fourth data, generates the second data or the third data, and controls the first to fourth data.

The driverware program comprises the following steps and causes an electronic computer to execute these processing steps, thereby controlling the electronic computer and causing same to operate. The driverware program comprises a process control list reading step of reading from an external storage device which is built into the electronic computer or connected thereto based on the execution file of the application program running on the electronic computer or the process of the execution file and of reading a process control list which is stored in the external storage device built into the electronic computer or connected thereto, this list deciding to permit or deny writing to the external storage device.

The driverware program further comprises a detection step of detecting the connection of the storage device storing the user data when the storage device is connected to the electronic computer, a control mode step of making settings to completely deny access to read from the external storage device comprising the storage device or write to the external storage device in order to turn the control mode ON, and a monitoring step of monitoring the access.

In addition, the driverware program comprises a reception step of receiving one or more control data which are selected from among the file name of the execution file, the file path of the execution file, the process name of the process, and the process ID of the process when the application program starts up, and a comparison step of comparing the control data thus acquired with the values of the process control list, when the application program starts up. Furthermore, the driverware program comprises a control step of granting or denying permission in accordance with the process control list in cases where control data match the values of the process control list in the comparison step or denying permission in cases where the control data do not match the values of the process control list.

Acquisition of Process Name and Process ID

The driverware program comprises an application platform program which runs in the user mode of the operating system and which serves to provide a user interface with the file system of the operating system. The application platform program comprises the following steps. The application platform program comprises a step of causing the process to operate in a suspend mode, a process acquisition step of acquiring the handle, process name, and process ID of the process operating in the suspend mode, and a transmission step of transmitting the process name and process ID acquired in the process acquisition step to the application program interface section.

The control unit of the driverware program comprises the steps of awaiting an application program end event, acquiring the process ID when an end event occurs, setting a prohibition for file access based on the process ID for the file system control unit, cancelling a communication prohibition setting for an interface control unit, and a step of canceling a communication prohibition setting for a network control unit.

Decoding Step

The driverware program comprises the steps of reading user data from the storage device, decoding the user data, and transferring the user data to the application program.

Setting and Operation of Control Mode

The control mode step further comprises one or more steps which are selected from the group consisting of the steps of prohibiting writing to the external storage device, prohibiting writing to a removable drive which is connected to the electronic computer, prohibiting the usage of one or more communication ports which are selected from the group consisting of RS-232C, IrDA, USB, and IEEE1394, which are serial interfaces for a serial transfer system and IEEE1284, SCSI, and IDE, which are parallel interfaces for a parallel transfer system, prohibiting the usage of the copy and paste function, prohibiting the usage of screen capture, prohibiting the usage of the clipboard, and prohibiting the network function.

The driverware program comprises a control mode cancellation step of turning the control mode OFF by completely canceling all of the steps performed in the control mode step when the storage device has been disconnected from the electronic computer.

Constitution and Functions of the Storage Device

The storage device may have a user area which is an area for storing user data and which permits reading and writing and a program area dedicated to reading which is an area for storing programs. In addition, the dedicated program which is stored in the program area may automatically start up when the storage device is connected to the electronic computer, and, after confirming the driverware, transmit a command to turn ON the control mode of the driverware to the driverware. When the control mode is ON, the dedicated program may cause the operating system to recognize the user area to enable access by the electronic computer to the user data.

Acquisition of Control Data by Control Unit

The file system control unit may comprise a step in which an access request for access by the application program to the external storage device is received and a step in which the access request thus received is transmitted to the control unit. In addition, the control unit may comprise the steps of receiving an access request which is transmitted by the file system control unit, acquiring control data from the access request, and transmitting the control data thus acquired to the file system control unit.

In addition, the file system control unit may comprise the steps of receiving control data transmitted by the control unit, comparing the control data thus received with the values of the process control list, permitting or denying access in accordance with the process control list in cases where the control data match the values of the process control list, and permitting access in cases where the control data do not match the values of the process control list.

Storage Device Authentication Section, Encryption Section, Decoding Section, and Log Acquisition Section The storage device may comprise an authentication section for individually authenticating a client who utilizes the storage device. The driverware may comprise an encryption section for encrypting user data and a decoding section for decoding the encrypted user data. The driverware may further comprise a log acquisition section.

The present invention affords the following effects.

The present invention makes it possible to prevent copying of the user data and the usage thereof for a purpose other than the intended purpose by setting all of the external storage devices which are built into or connected to the client computer to a write prohibition state by means of management means which runs on the client computer when the storage device storing the user data is connected to the client computer and making settings so that network usage is also prohibited, and makes it possible to suitably manage the user data.

The present invention makes it possible to limit the copying of user data as well as electronic data created by utilizing the user data by making settings to write-prohibit all of the external storage devices which are built into or connected to the client computer by means of management means which runs on the client computer when the storage device which stores the user data is connected to the client computer and by making settings so that network usage is also prohibited.

BRIEF DESCRIPTION OF THE DRAWINGS

FIG. 9 is a flowchart which shows the operation when the management program 4 turns the control mode ON;

LIST OF ELEMENTS

Figure 1:
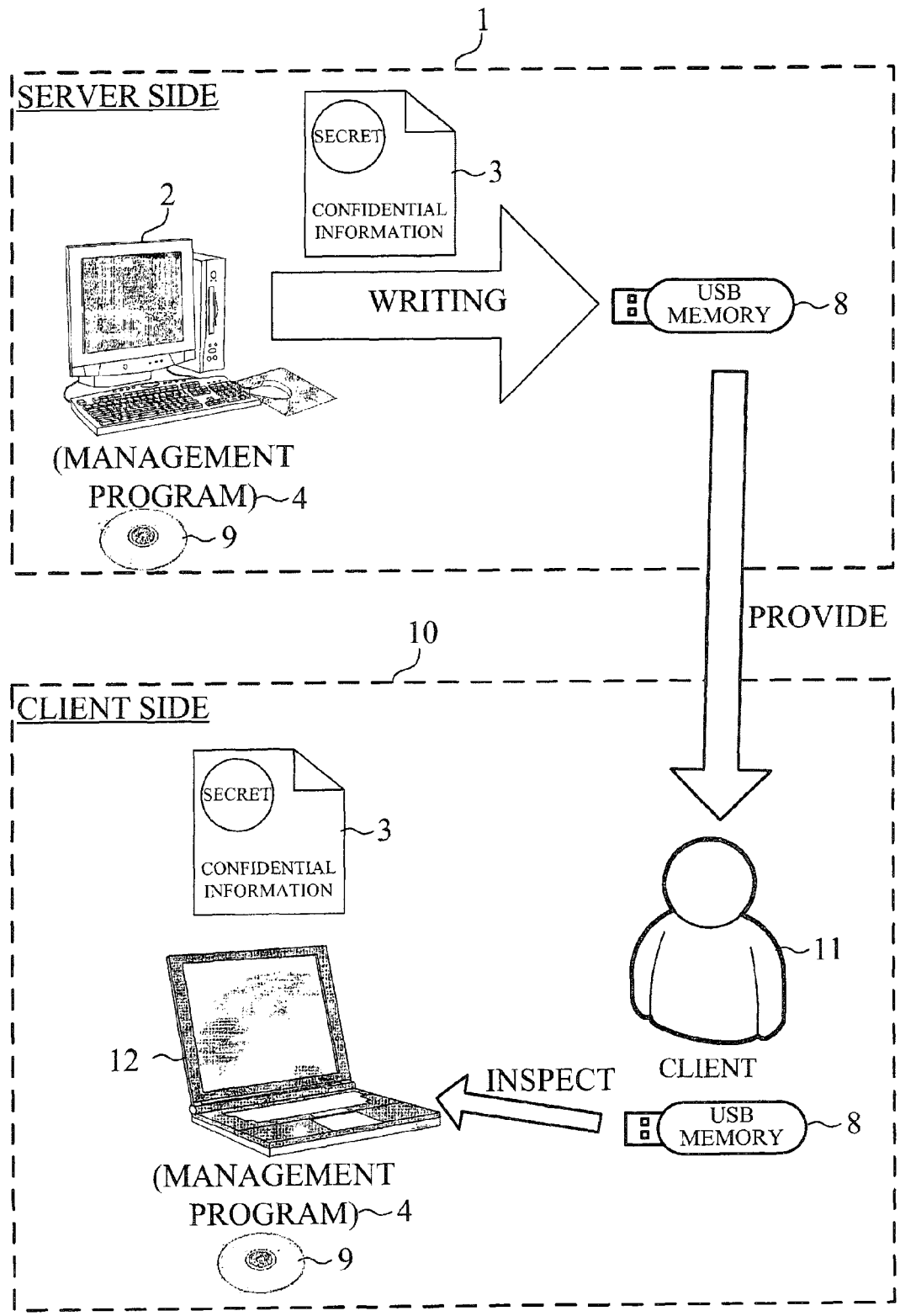
FIG. 1 shows an outline of an embodiment of the present invention.

1 . . . server side
2 . . . server
3 . . . user data
4 . . . management program
5 . . . application platform program
6 . . . external device
7 . . . network
8 . . . USB memory
9 . . . recording medium
10 . . . client side
11 . . . client
12 . . . client computer
13 . . . subsystem
14 . . . user mode
15 . . . kernel mode
16 . . . executive
17 . . . kernel
18 . . . hardware abstraction layer
20 . . . application program
21 . . . operating system
22 . . . connector
23 . . . network card
24 . . . USB port
25 . . . hard disk 26 ... built-in device
32 ... interface driver
33 ... network driver
34 ... file system driver
35 ... second device driver
36 ... first device driver
42 ... interface control unit
43 ... network control unit
44 ... file system control unit
45 ... second device driver control unit
46 ... first device driver control unit
50 ... driverware
51 ... application program interface section
52 ... control unit
53 ... log acquisition section
54 ... encryption section
55 ... decoding section
105 ... substrate
106 ... user area
107 ... program area
108 ... central processing unit
109 ... USB controller

BEST MODE FOR CARRYING OUT THE INVENTION

An embodiment of the present invention will be described hereinbelow with reference to the drawings.

Embodiment of the Present Invention

FIG. 1 shows an outline of an embodiment of the present invention. A server side 1 is constituted by at least one server 2 and provides user data 3. The user data 3 are electronic data provided by the server side 1. Client side 10 is constituted by a client computer 12 which is to be operated by a client 11. The client 11 receives the provision of user data 3 from the server side 1 and carries out work on the client computer 12.

The present invention provides a management system for monitoring and tracking the usage status of the user data 3 when the user data 3 provided by the server side 1 are used to perform work on the client computer 12. The management system comprises a management program 4 for operating the electronic computer of the server side land client side 10. The management program 4 is a program for providing an environment for utilizing the user data 3 on the client computer 12. The present invention also provides the USB memory 8 for storing and carrying the user data 3.

Figure 4:
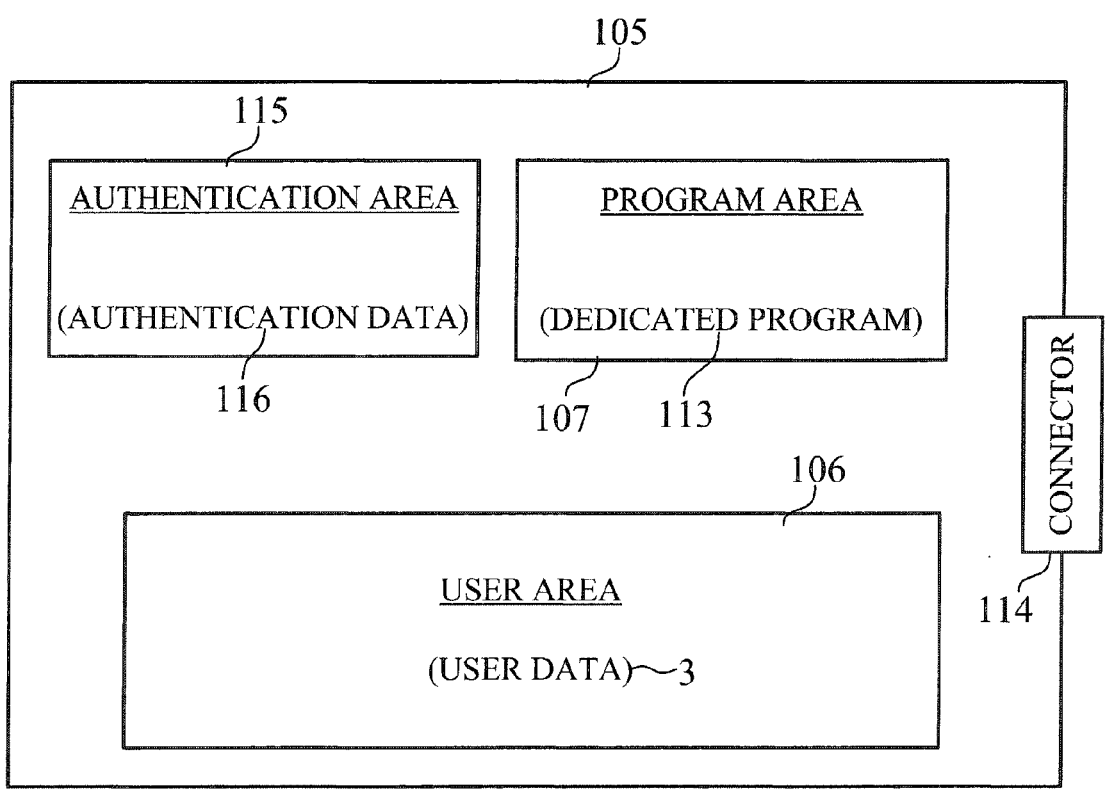
FIG. 4 is a block diagram which shows the internal structure of a USB memory 8.

The USB memory 8 comprises a user area 106 and a program area 107 for storing electronic data and a computer program (See FIG. 4). The user data 3 are stored in user area 106 (See FIG. 4) of the USB memory 8 and cannot be accessed from the outside with the initial settings of the USB memory 8. The USB memory 8 stores a dedicated program 113 in the program area 107. The program area 107 cannot be accessed from the outside with the initial settings of the USB memory 8. When the USB memory 8 has been connected to an electronic computer such as the client computer 12 and recognized, the program area 107 can be directly accessed by the electronic computer.

The dedicated program 113 switches the switch in the USB memory 8 by means of software and permits access from the electronic computer. The details will be provided subsequently in the description of FIG. 4 and the description of the flowcharts of FIGS. 6 and 7. The user data 3 are data in which know-how have been accumulated. For example, the user data are a restoration manual of an insurance company which is to be used in the event of a disaster. In addition, the user data is a product specification or design document which is to be utilized by the manufacturer. In addition, the user data are original electronic data which are to be used during the proofreading of publications and photo data or other image data. In addition, the user data is a data file in which personal information and customer information or the like are stored.

Personal information signifies information such as full name, address, and contact address information, for example. Customer information includes information such as the customer's full name, the name, the address, the contact address and transaction details and so forth, for example. Data such as personal information and customer information and so forth will subsequently appear simply as 'user data 3'.

The server side 1 records the user data 3 and management program 4 in the recording medium or storage device and provides the user data 3 and management program 4 to the client 11. The recording medium is a recording medium such as a flash memory, a flexible disk, a compact disk, an MO (Magneto-Optical Disk), a DVD (Digital Versatile Disks) or the like, for example. The storage device is preferably a device which makes it possible to store and carry around electronic data such as a USB (Universal Serial Bus) memory, a memory card, or a hard disk.

The user data 3 and management program 4 can be recorded in the same recording medium or storage device and provided to the client 11. In addition, the user data 3 and management program 4 can also be provided to the client 11 via a network. The user data 3 can be provided by a network sharing folder or a NAS or other network storage device. Thus, the method for providing the user data 3 and the management program 4 from the server side 1 to the client side 10 is no object. The embodiment of the present invention adopts a method according to which the user data 3 are stored in the USB memory 8 and provided from the server side 1 to the client side 10. The management program 4 is stored in the recording medium 9 and provided to the server side 1 and client side 10.

However, there are no restrictions on the method of providing the user data 3 and management program 4, the storage device used, or the recording medium, which may take any form provided that same have the same functions. The USB memory 8 which is used as the storage device in the embodiment of the present invention is a portable storage device which has a built-in flash memory. The USB memory 8 is a storage device which conforms to the USB standard.

The USB standard is a standard for performing data transfers between an electronic computer and a peripheral device, which introduces specifications for recognizing an external storage device as a removable drive known as the 'USB Mass Storage Class'. The USB memory 8 conforms to the USB Mass Storage Class and uses a Mass Storage Class driver which is held on the operating system side to transmit and receive electronic data between the USB memory 8 and electronic computer. When introduced to the USB port of the electronic computer, the USB memory 8 is recognized by the operating system as a removable drive.

The server side 1 writes user data 3 from the server 2 to the USB memory 8. The server 2 is an electronic computer comprising a central processing unit, an I/O device, an internal memory such as a ROM or RAM, and a hard disk. The client computer 12 is not illustrated but is an electronic computer which comprises a central processing unit, an I/O device, or an internal memory such as a ROM or a RAM.

Figure 2:
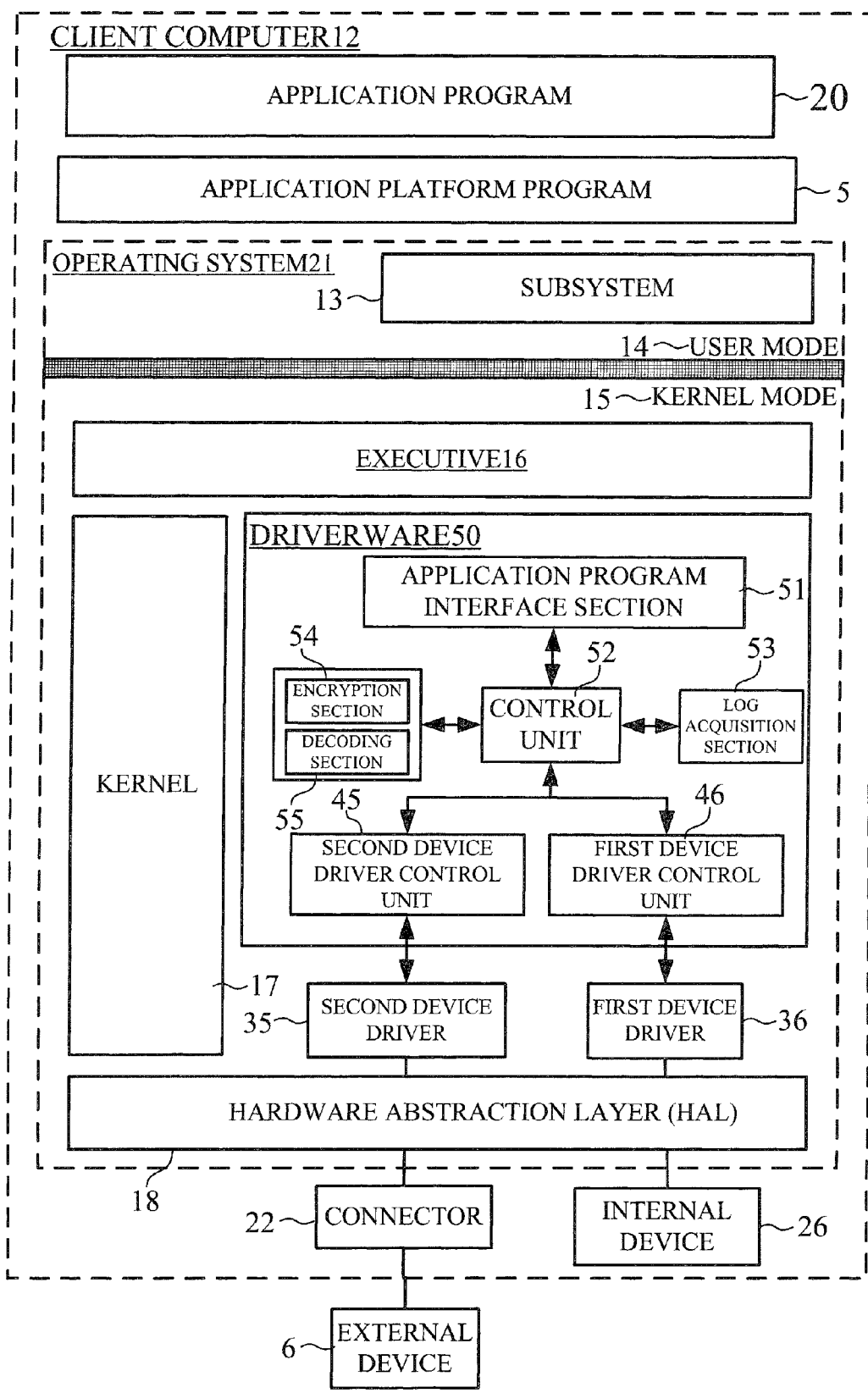
FIG. 2 shows an outline of software which runs on a client computer 12.

FIG. 2 provides an overview of the software which runs on the client computer 12. In the embodiment of the present invention, the operating system 21 is Windows XP by Microsoft (registered trademark). However, the operating system 21 is not restricted to Windows XP. As long as the same functions can be implemented, the type of operating system is not an issue. The application program 20 runs on the operating system 21.

The management program 4 illustrated in FIG. 1 is constituted by an application platform program 5 and driverware 50 which are illustrated in FIG. 2. The application platform program 5 is application software which runs in user mode 14 of the operating system 21. The driverware 50 is a program which runs in kernel mode 15 of the operating system 21. The operation and functions of the application platform program 5 and driverware 50 will be described subsequently.

The client computer 12 is not illustrated but comprises input devices such as a keyboard and mouse or the like, an output device such as a display, an external storage device such as a hard disk, and a memory such as a main memory. The client computer 12 can comprise peripheral devices such as an external hard disk, a scanner, and a printer. These peripheral devices are illustrated abstractly as the external device 6. In addition, the devices which are built into the client computer 12 such as the hard disk, mouse, and keyboard are illustrated abstractly as the built-in device 26. The external device 6 is connected to a printer 22.

The client computer 12 is controlled and operated by the operating system 21. The application program 20 which runs on the client computer 12 utilizes the functions provided by the operating system 21 to make inputs and outputs from the I/O device and performs the required processing. The application program 20 is an executable file or software program which runs in kernel mode 15 or user mode 14 of the operating system 21. For example, the application program 20 may be a software program for creating and editing documents such as word processing software or a text editor. The application program 20 may also be software for inspecting, creating, and editing files in a specified format such as files in the pdf format.

The operating system 21 provides an input/output function for inputs and outputs from an I/O device such as inputs from the keyboard, mouse operation inputs, and screen outputs and basic functions such as the management of external storage devices and constitutes software for operating and managing the whole client computer 21. The operating system 21 is constituted by a multiplicity of executable programs in order to implement the functions provided. There are a multiplicity of publications relating to the operating system 21 and, in particular, the Windows Operating system which is used in the embodiment of the present invention. Some of these publications are introduced below. In order to reproduce the present invention, the technical knowledge that appears in these publications and, in particular, knowledge relating to the development of device drivers, is required.

Publication list relating to the internal constitution and operation of the Windows Operating system:
Inside Windows NT by Helen Custer (Microsoft Press, 1992)
Inside the Windows NT File System by Helen Custer (Microsoft Press, 1994)
Inside Microsoft Windows 2000, Third Edition by David A. Solomon, Mark E. Russinovich (Microsoft Press, 2000).

Publication list relating to a basic knowledge of device drivers to their development:
Programming the Microsoft Windows Driver Model by Walter Oney (Microsoft Press, 1999)
Programming the Microsoft Windows Driver Model, Second Edition by Walter Oney (Microsoft Press, 2002).

Here, the representative elements among the constituent elements of the operating system 21 will be mentioned. The operating system 21 is constituted by a subsystem 13, an executive 16, a kernel 17, device drivers 35 and 36, and a hardware abstraction layer (HAL) 18.

The subsystem 13 is a service which is provided in user mode 14 of the operating system 21. The executive 16 provides the basic services of the operating system 21 such as memory management, process and thread management, security, I/O, networks, and communication between processes. The kernel 17 provides low-level functions such as thread scheduling, interrupts, exception reporting, and multiprocessor synchronization. In addition, the kernel 17 provides a routine set and a basic object which are used within the executive 16.

The device drivers 35 and 36 are illustrated in FIG. 2 as a first device driver 36 and a second device driver 35. The device drivers 35 and 36 are normally created for each hardware item connected to the client computer 12 and directly control the hardware via the hardware abstraction layer 18. The device drivers 35 and 36 provide services to convert I/O function requests (I/O call requests) from the application program 20 or operating system 21 into I/O function requests (I/O requests) for the specified hardware device and file system and network driver services or other system services.

The hardware abstraction layer 18 is a code layer for separating and abstracting the kernel 17, device drivers 35 and 36 and the executive 16 from the platform-specific hardware functions. The hardware abstraction layer 18 assimilates the types and type errors of the hardware of the built-in device 26 of the client computer 12 and the external device 6 which is connected to the client computer 12 and provides services obtained by abstracting the respective services of the operating system 21. The various services which constitute the operating system 21 are able to access the hardware without being aware of the types of hardware and the type errors.

Driverware 50

The driverware 50 serves to implement the sending and receiving of data between device drives in kernel mode. The driverware 50 provides a common interface when the device drivers 35 and 36 are accessed by the application program 20 and when data are transmitted from the device drivers 35 and 36 to the application program 20. The driverware 50 runs in kernel mode 15 of the operating system 21. The driverware 50 has a function to send and receive data not only between the device drivers 35 and 36 but also between the operating system 21 and the plurality of device drivers 35 and 36.

An example of the driverware 50 is the widely known technology disclosed in WO02/091195 for the interface driver program of the electronic computer.

The driverware 50 comprises an application program interface section 51 for receiving commands and data and so forth from the application program 20 and transmitting data to the application program 20. The driverware 50 comprises a control unit 52 for controlling the operation of the whole driverware 50. The driverware 50 further comprises a log acquisition section 53 for acquiring the history of the operation of the driverware 50. In addition, the driverware 50 comprises a first device driver control unit 46 and a second device driver control unit 45 for controlling the first device driver 36 and second device driver 35 respectively.

The driverware 50 comprises an encryption section 54 for encrypting the data to be communicated and a decoding section 55 for decoding the encrypted data. The control unit 52 is a core section of the driverware 50 which serves to control and monitor the other parts of the driverware 50 such as the first device driver control unit 46, the second device driver control unit 45, the application program interface section 51, the log acquisition section 53, the encryption section 54, and the decoding section 55.

Application Platform Program 5

The application platform program 5 is an application program which is located between the application program 20 and the operating system 21 and which serves to perform control via the sending and receiving of commands and data between the application program 20 and operating system 21. The application platform program 5 runs in user mode 14 of the operating system 21. The application platform program 5 is an application program which serves to provide a user interface for accessing the file system of the operating system 21.

The application platform program 5 has a function to monitor the startup of the application program 20 and the startup of the corresponding processes and to acquire the attribute information. The application platform program 5 is particularly preferably an application program which is compatible with Windows Explorer.

Figure 3:
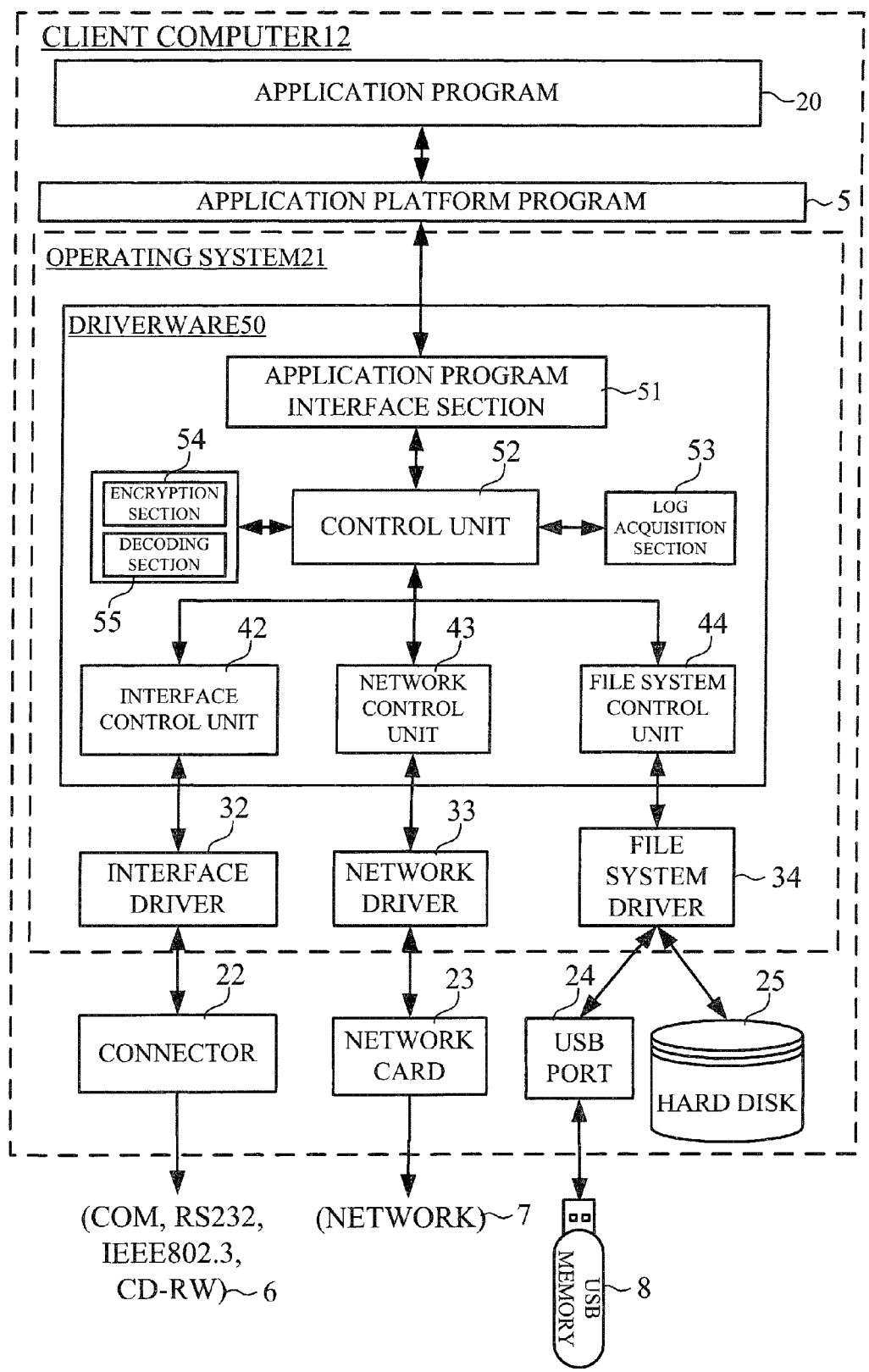
FIG. 3 shows an outline of an embodiment of the present invention.

FIG. 3 provides an outline of this embodiment. FIG. 3 illustrates a specific example of the device drivers 35 and 36, the external device 6, and the built-in device 26 which are abstractly illustrated in FIG. 2. In addition, the client computer 12 comprises an external storage device such as a hard disk 25. The client computer 12 comprises a connector 22 for a connection with a peripheral device. The connector 22 is preferably a serial port such as RS-232C, an IrDA, USB, or IEEE1394, or a parallel port such as an IEEE1284, SCSI, or IDE.

The serial transfer system is a data transmission system for transmitting data one bit at a time via a single signal wire. A parallel transfer system is a data transmission system for transferring a plurality of bits simultaneously via a plurality of signal wires. The interface which is optimum for each application is employed in the data transmission between the devices built into the electronic computer, the electronic computer and the peripheral devices. Here, the illustration is based on a representative example. In the case of a storage device, the parallel transfer system is high speed and this transmission system is often adopted. However, due to the popularization of the USB standard, a USB port is often utilized. An IEEE1284 port or an USB port is often used for communication between the electronic computer and a printer and the communication sometimes also takes place over a network.

The client computer 12 comprises a network card 23 for a connection with a network 7. The client computer 12 further comprises a USB port 24 for connecting devices conforming to the USB-standard such as the USB memory 8. A program for directly controlling the connector 22 and network card 23 and performing communications is an interface driver 32 and a network driver 33 which are the respective device drivers.

In this embodiment, the device drivers 32 to 34 are described as belonging to the operating system 21. The interface driver 32 is a device driver for controlling the connector 22. The network driver 33 is a device driver for controlling the network card 23.

The file system driver 34 manages information relating to the files and folders which are saved in an external storage device such as the hard disk 25 and provides access to the files and folders saved in the hard disk 25. The file system driver 34 also provides access to storage devices conforming to the USB standard which are connected to the client computer 12. This access is carried out via a Mass Storage Class driver (not shown) of the operating system 21.

The application program 20 is software that is installed on or runs on the client computer 12. The application program 20 runs in user mode 14 of the operating system 21. The application program 20 accesses the hard disk 25 and reads and writes the required files. Furthermore, the application program 20 also signifies some of the programs which run in the Windows (registered trademark) kernel mode 15.

The driverware 50 provides a common interface when the device drivers 32 to 34 are accessed by the application program 20 and when data are transmitted by the device drivers 32 to 34 to the application program 20. The driverware 50 comprises the application program interface section 51, the control unit 52, and the log acquisition section 53, and so forth.

The driverware 50 comprises the encryption section 54 for encrypting data to be communicated and the decoding section 55 for decoding the encrypted data. The driverware 50 further comprises an interface control unit 42 for controlling the interface driver 32. The driverware 50 comprises the network control unit 43 for controlling the network driver 33. The driverware 50 comprises a file system control unit 44 for controlling the file system driver 34.

The control unit 52 is a central unit of the driverware 50 which serves to control and monitor the other parts of the driverware 50 such as the interface control unit 42, the network control unit 43, and the file system control unit 44. When connected to the client computer 12, a storage device such as the USB memory 8 is controlled by the file system driver 34 after being recognized by the device driver of the device. It can be seen that the interface control unit 42, the network control unit 43, and the file system control unit 44 and so forth of the driverware 50 ultimately control the devices which are connected to or built into the client computer 12 by controlling the device drivers 32 to 34 of the client computer 12.

That is, in order to control a device that is connected to or built into the client computer 12, the existing device drivers 32 to 34 are utilized. The driverware 50 controls the interface via which the device drivers 32 to 34 communicate with the other constituent parts of the operating system 21 in kernel mode.

FIG. 4 is a block diagram which shows the internal constitution of the USB memory 8. FIG. 4 provides an overview of the constitution of a substrate 105 which is stored in an enclosure (not shown). User area 106 and program area 107 and so forth are disposed mounted on the substrate 105. User area 106 is a memory for storing the user data 3. The program area 107 is a memory for storing the dedicated program 113 (described subsequently).

A connector 114 is a connector for connecting the USB memory 8 to the client computer 12. The USB memory 8 has a secret area for storing data and so forth. For example, the USB memory 8 has an authentication area 115 for storing authentication data 116 which are utilized for authentication. The authentication data 116 stored in the authentication area 115 is used for the authentication of the USB memory 8 and the personal authentication of the user of the USB memory 8, and so forth.

The user data 3 and dedicated program 113 are stored in the user area 106 and program area 107 which are separate memory areas of the USB memory 8. When the USB memory 8 is connected to the client computer 12, the user area 106 and program area 107 are recognized by the operating system 21 as removable drives. In the initial setting of the USB memory 8, the program area 107 enters a state of being accessible by the operating system 21.

The user area 106 is set so that same cannot be accessed by the client computer 12 in the initial setting. The dedicated program 113 stored in the program area 107 starts up automatically and runs on the client computer 12. When the dedicated program 113 successfully performs authentication, the user area 106 is set to be accessible by the client computer 12. This setting is carried out by switching the switch in the USB memory 8 (not shown).

The authentication which is performed by the dedicated program 113 comprises confirmation of the management program 4 which is introduced on the client computer 12 and personal authentication of the client 11. The dedicated program 113 confirms that the management program 4 has been installed on the client computer 12 by communicating with the management program 4. The dedicated program 113 turns ON the control mode (the details of which will be provided subsequently) of the management program 4 by means of an instruction to the management program 4. The personal authentication of the client 11 preferably entails authentication by means of a password or biometric authentication or the like. In this embodiment, the personal authentication of the client 11 will be described as authentication by means of a password.

Figure 5:
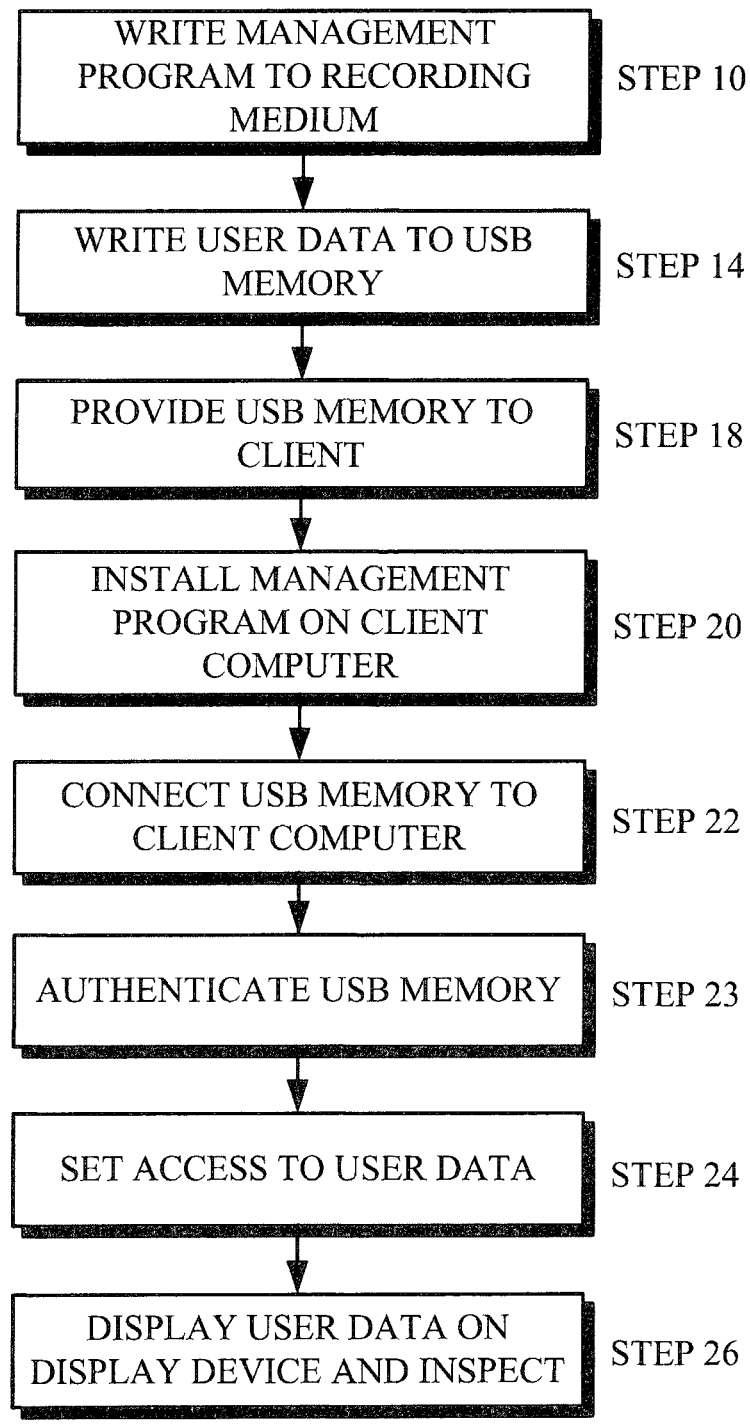
FIG. 5 is a flowchart showing the overall operation.
Figure 6:
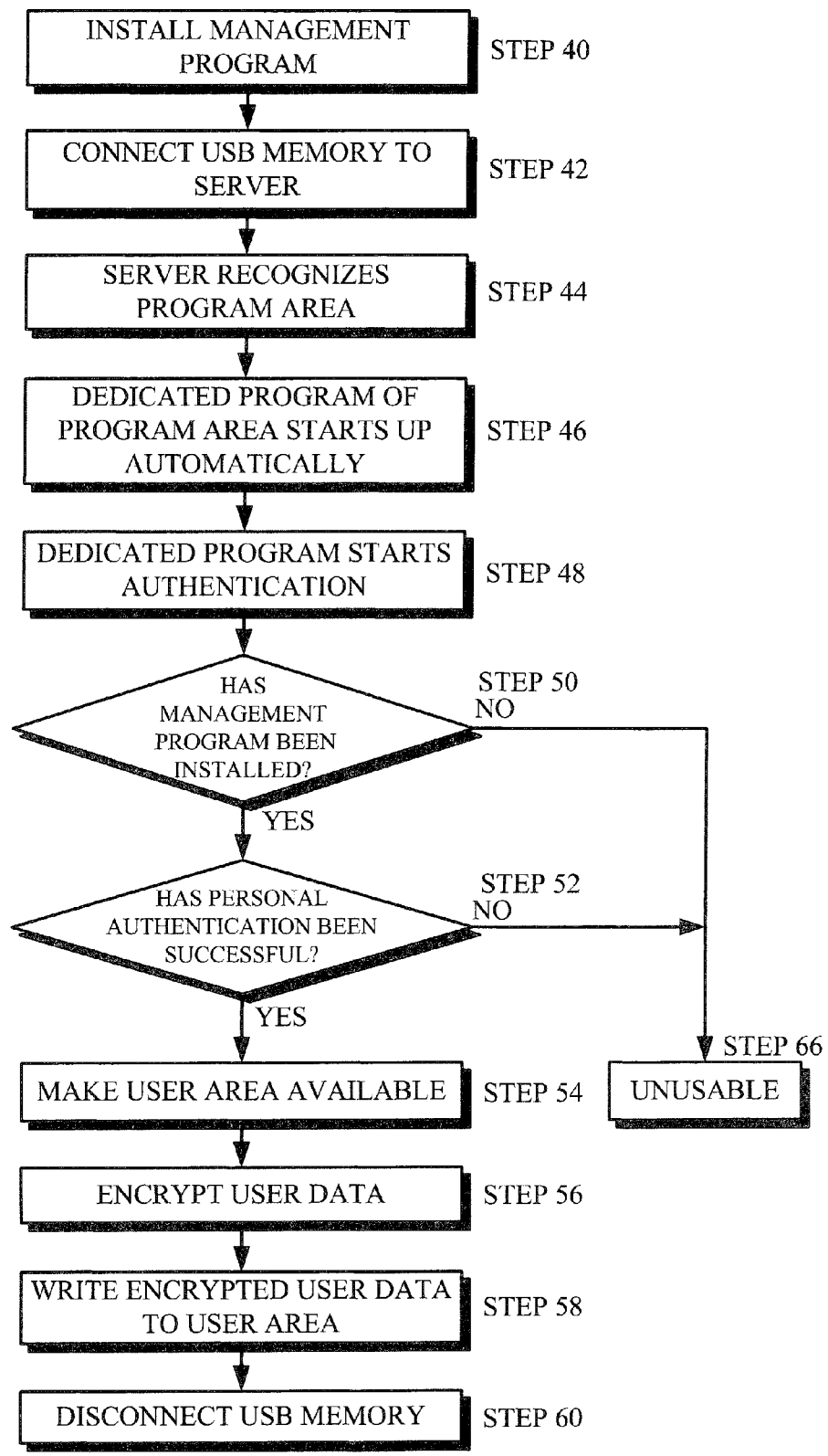
FIG. 6 is a flowchart showing the flow when writing user data 3 and a management program 4 in a server 2 to a storage device 8 and a recording medium 9.

FIG. 5 is a flowchart showing the whole operation. The management program 4 stored in the recording medium 9 is introduced to the server 2 through installation thereon (step 10). The recording medium 9 is preferably a CD-ROM. The USB memory 8 is connected to the server 2 and the user data 3 are written from the server 2 to the USB memory 8 (step 14). A detailed flow according to which the user data 3 are written from the server 2 to the USB memory 8 is shown in FIG. 6. The USB memory 8 is provided to the client 11 (step 18).

The client 11 receives the USB memory 8 provided by the server side 1. The client 11 sets the recording medium 9 in the recording medium driver of the client computer 12 and installs the management program 4 on the client computer 12 (step 20). The management program 4 which is installed on the client computer 12 may also be the same as the management program 4 installed on the server 2. Further, the management program 4 may work in cooperation with the management program 4 installed on the server 2 due to the license authentication and so forth.

Thereafter, the management program 4 installed on the client computer 12 works in cooperation with the management program 4 installed on the server 2 due to the license authentication. When the management program 4 is not installed on the client computer 12 in this manner, the user data 3 stored in the USB memory 8 cannot be read from the client computer 12, displayed on the output device and inspected by the client 11. Settings are made so that the user data 3 stored in the USB memory 8 can be read and used only from an environment provided on the client computer 12 by the management program 4.

When the management program 4 is installed on the client computer 12, license authentication of the management program 4 is desirably performed. The license authentication may be performed by connecting the management program 4 to the server side 1 via a network 7 such as the Internet. The license authentication may also be performed as a result of the client 11 inputting, via the input device of the client computer 12, an authentication identification number which is provided to the client 11 from the server side 1.

The USB memory 8 is inserted and connected by the client 11 into the USB port 24 of the client computer 12 (step 22). The operating system 21 which is running on the client computer 12 recognizes the USB memory 8 by utilizing the plug and play (PnP) function. When the USB memory 8 is recognized by the client computer 12, the Mass Storage Class driver of the operating system 21 is used in order to be able to access the data stored in the USB memory 8 via the file system of the operating system 21.

The management program 4 acquires the result of the operating system 21 recognizing the USB memory 8 and performs authentication of whether the USB memory 8 is the USB memory 8 provided by the server side 1 (step 23). When the authentication is performed, the management program 4 confirms the authentication data 116 in the authentication area 115 such as the identification number and model number of the USB memory 8 and the PIN number or encryption key or the like for identifying the client. As a result of the authentication, it is confirmed whether the management program 4 and USB memory 8 can be utilized as a pair. When the authentication ends normally, the management program 4 makes settings for access to the USB memory 8. This authentication is carried out by the communication of the dedicated program 113 and management program 4 which are stored in the USB memory 8 and run by starting up automatically.

Figure 9:
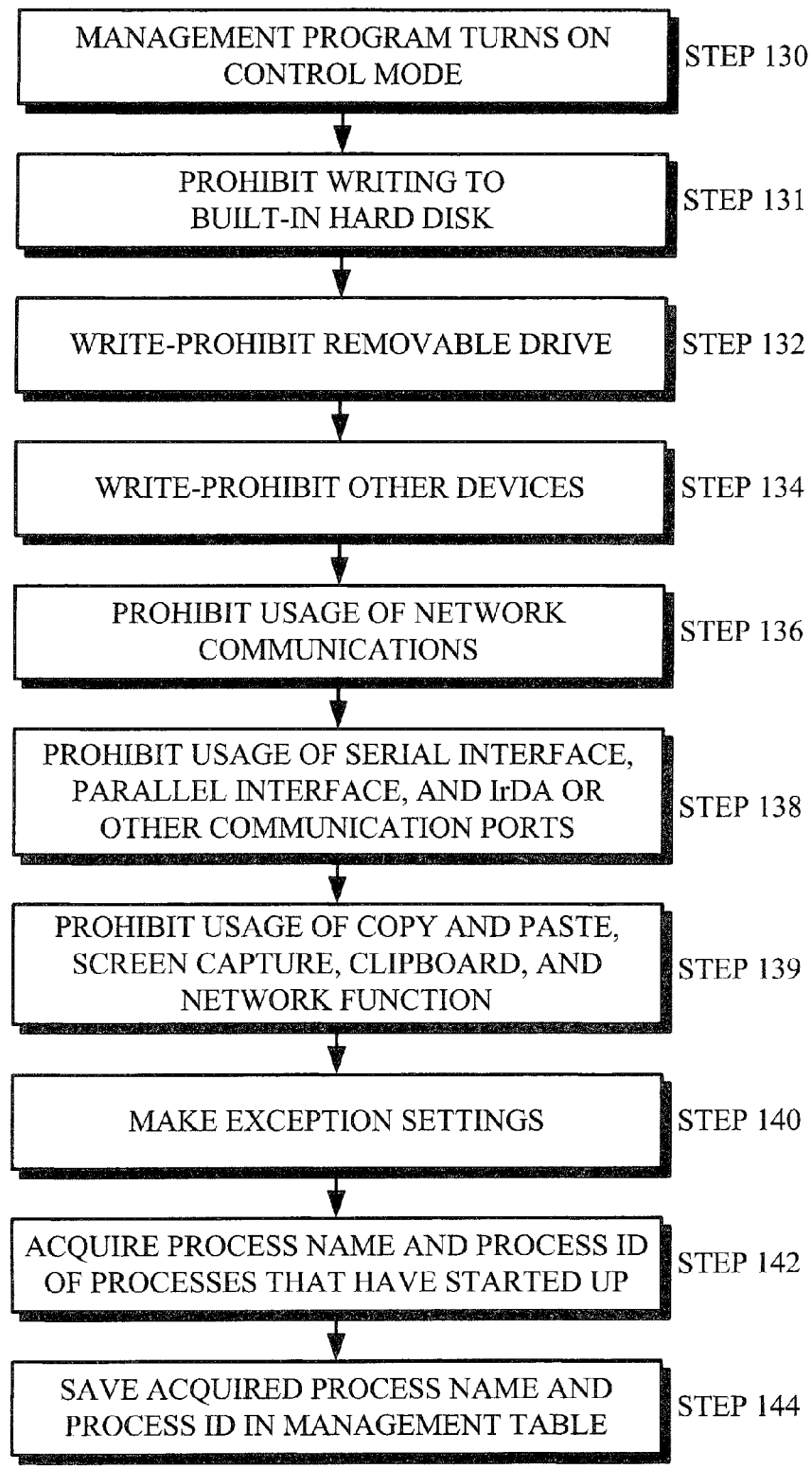

The user data 3 which are stored in the USB memory 8 are then accessible (step 24). The management program 4 monitors all of the access requests for access from the client computer 12 to the USB memory 8. The management program 4 monitors the application program 20 which runs on the client computer 12 and all of the processes which start up when the application program 20 is executed. The management program 4 executes only the access requests which conform to predetermined conditions. Predetermined conditions can be set to permit only reading of the user data 3 (step 26). The setting of the predetermined conditions are shown in the flowchart of FIG. 9.

In the case of an access request which does not match the predetermined conditions, all access relating to the user data 3 is denied and cancelled. For example, access involving the rewriting of the user data 3, the editing and saving of the user data 3, and the copying of the user data 3 is denied and cancelled. When settings are made in this way, the editing of the user data 3 in the client computer 12 is impossible and the copying of the user data 3 to another external storage device such as the hard disk 25 is also impossible. The management program 4 makes settings to prohibit the network function, the usage of various communication ports and the clipboard, screen capture, the copy and paste function, and the usage of the network function, and so forth. In addition, the management program 4 makes settings to prohibit the usage of the printer by prohibiting outputs to the communication port to which the printer is connected and prohibiting the usage of the printer driver, and so forth.

Although an example for making these prohibition settings is provided, the method is not limited to this method. By prohibiting the pushing of the Ctrl+C keys on the keyboard and right-clicking with the mouse, the copying of data can be prohibited. The usage of the clipboard can be prohibited by automatically clearing the data on the clipboard. The settings to prohibit usage of the clipboard are specifically such that an event is produced when the clipboard is utilized and therefore the event is hooked and the data on the clipboard are erased.

The usage of screen capture can be prohibited by prohibiting the usage of the screen capture key of the keyboard. By making settings in this manner, the user data 3 can no longer be copied, printed, and transmitted to another party, and secondary electronic data can no longer be created by utilizing the user data 3 and acquired as an image from the display screen. The management program 4 is able to prohibit the output to the printer by prohibiting usage of the spooler.

FIG. 6 is a flowchart which shows the flow when the user data 3 are written to the USB memory 8 in the server 2. In order for the user data 3 to be written from the server 2 to the USB memory 8, the management program 4 must be installed and run on the server 2. The management program 4 is written to the recording medium 9 and provided to the server side 1. The recording medium 9 is set for the recording medium drive of the server 2. The management program 4 is installed on the server 2 from the recording medium 9 (step 40).

The USB memory 8 for writing user data 3 is connected to the server 2 (step 42). The USB memory 8 is recognized by the server 2. The USB memory 8 comprises a plurality of memory areas such as the program area 107, user area 106, and secret area. The program area 107 in the plurality of memory areas is recognized by the server 2 (step 44). The dedicated program 113 stored in the program area 107 starts up automatically and is executed (step 46).

The dedicated program 113 starts authentication of whether the management program 4 has been installed on the server 2 (step 48). In cases where the management program 4 is installed on the server 2, personal authentication using a password is carried out (step 50). When personal authentication is successful, the dedicated program 113 causes the user area 106 of the USB memory 8 to be recognized by the server 2. Accordingly, the user area 106 can then be accessed by the server 2 and is available (steps 52 and 54). The user data 3 are encrypted and written to the user area 106 (steps 56 and 58).

Thereafter, the USB memory 8 is disconnected from the server 2 and can be provided to the client 11 (step 60). The dedicated program 113 does not cause the server 2 to recognize the user area 106 in cases where the management program 4 has not been installed on the server 2 and in cases where personal authentication is not successful. Accordingly, the user data 3 can no longer be written to the user area 106 and the USB memory 8 cannot be utilized (steps 50, 52 to step 66).

Encryption preferably adopts a widely known encryption system which employs the pair of a widely known key and a secret key. However, this does not limit the encryption system. The encryption and decoding are not the spirit of the invention and therefore a detailed description thereof is omitted here.

Figure 7:
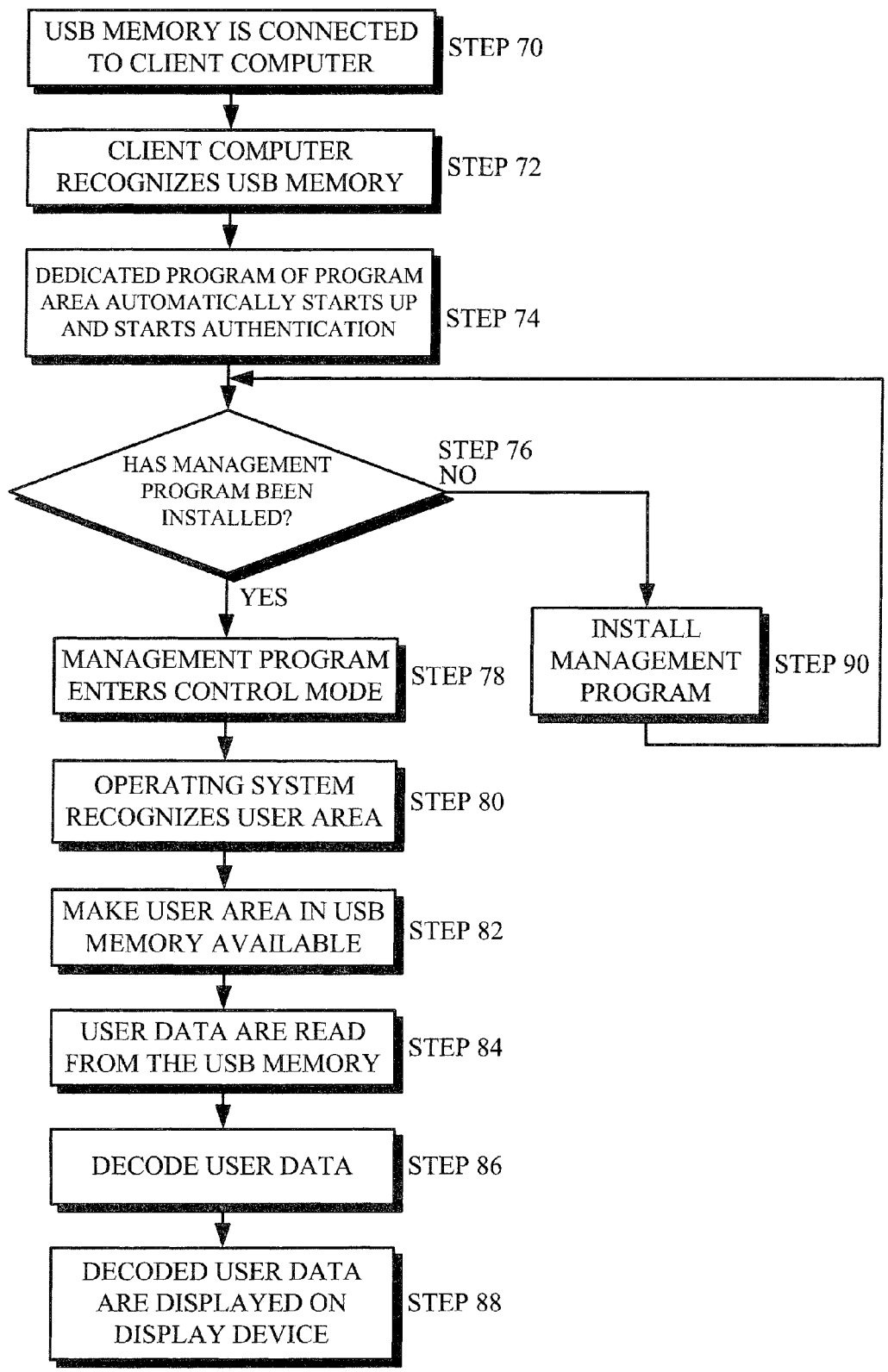
FIG. 7 is a flowchart which shows the flow when monitoring the user data 3 from the USB memory 8.

FIG. 7 is a flowchart which shows the flow when the user data 3 are read from the USB memory 8 and monitored by the client computer 12. The USB memory 8 is connected to the client computer 12 (step 70). The client computer 12 recognizes the USB memory 8 (step 72). Here, the operating system 21 senses and recognizes the connection of the USB memory 8 by utilizing the PnP function. The program area 107 in the plurality of memory areas of the USB memory 8 is recognized by the client computer 12.

When the USB memory 8 is recognized, the dedicated program 113 stored in the program area 107 of the USB memory 8 automatically starts up (step 74). The dedicated program 113 starts the authentication of whether the management program 4 has been installed on the client computer 12 (step 74). The dedicated program 113 confirms whether the management program 4 has been installed on the client computer 12 (step 76).

In cases where the management program 4 has 2 not been installed, the client 11 installs the management program 4 (steps 76 and 90). In cases where the management program 4 has been installed on the client computer 12, the client 11 performs personal authentication by means of a password (step 77). When the personal authentication is successful, the management program 4 is placed in control mode (steps 76 and 78). The details of the control mode are illustrated in the flowchart of FIG. 9.

When the control mode setting of the management program 4 ends, the dedicated program 113 causes the client computer 12 to recognize the user area 106 of the USB memory 8. Accordingly, the user area 106 can be accessed by the client computer 12 and is available (step 80). Reading of the user data 3 is permitted and the automatic decoding of encrypted user data 3 is also permitted (step 82).

The user data 3 are read from the USB memory 8 (step 84). The user data 3 read from the USB memory 8 are decoded (step 86). The decoded user data 3 are displayed on an output device such as the display of the client computer 12 (step 88). When entering control mode (see the description of FIG. 9), the management program 4 limits access to the respective devices so that user data 3 cannot be saved in the hard disk 25, USB memory 8, or other peripheral devices which are connected to the client computer 12.

Hence, the client 11 is unable to save the user data 3 in the hard disk 25 or in the peripheral devices connected to the client computer 12. In addition, upon entering control mode, the management program 4 makes a setting to prohibit the network function, usage of the various communication ports and the clipboard, and the usage of screen capture and the copy & paste function, and so forth. Accordingly, the user data 3 can no longer be manipulated outside of an inspection thereof.

Figure 8:
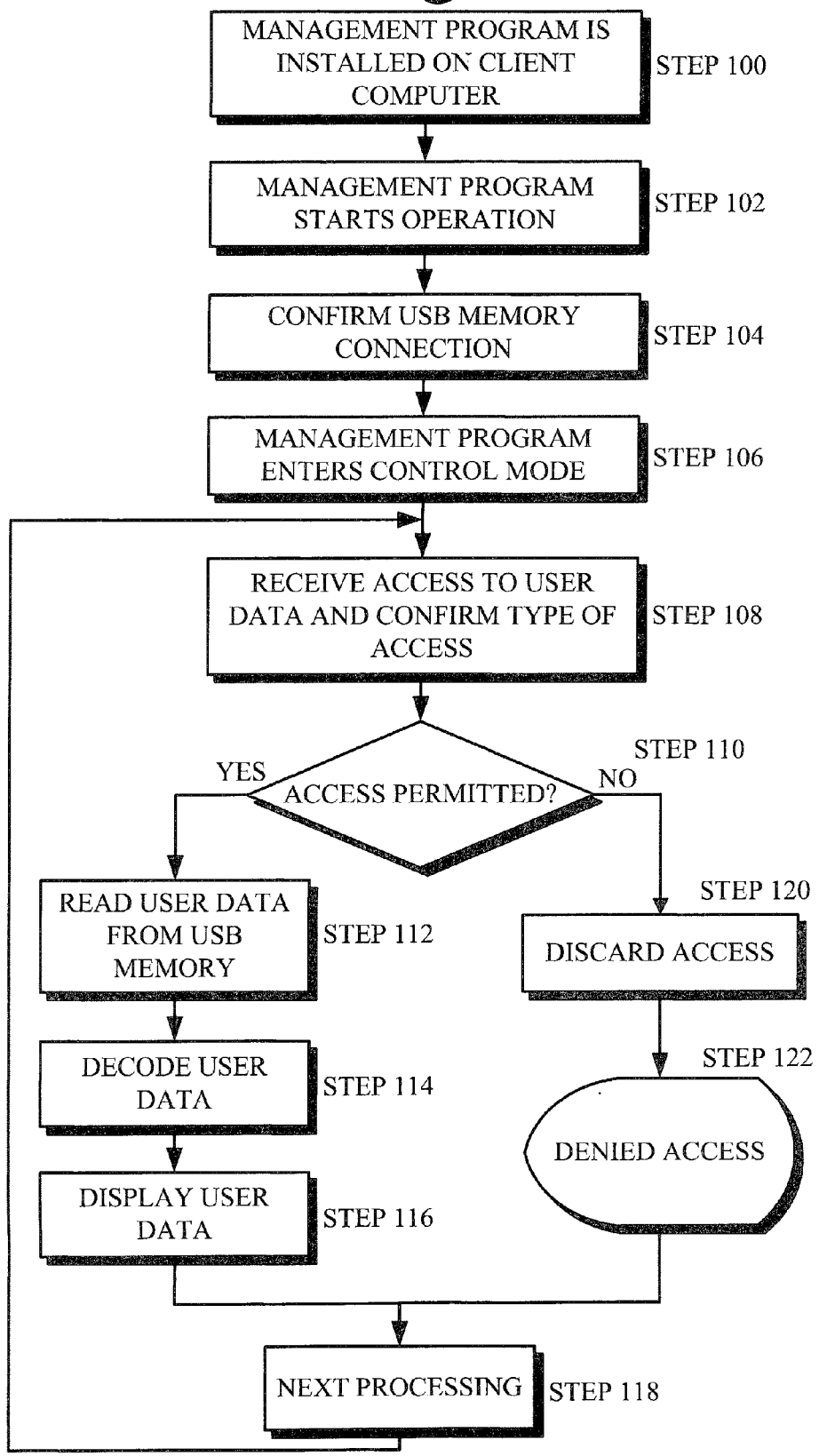
FIG. 8 is a flowchart which shows the operation of the management program 4.

FIG. 8 is a flowchart which shows the operation of the management program 4. The management program 4 is stored in the recording medium 9 and provided to the client 11. The management program 4 is installed in the client computer 12 by the client 11 (step 100). The management program 4 is started up and starts to run (step 102). When the USB memory 8 is connected to the client computer 12, the operating system 21 utilizes the PnP function to sense and recognize the connection of the USB memory 8. When the USB memory 8 is recognized, the dedicated program 113 stored in the program area 107 of the USB memory 8 automatically starts up (step 74 in FIG. 7).

The dedicated program 113 confirms whether the management program 4 has been installed in the client computer 12 (step 76 in FIG. 7). In cases where the management program 4 has been installed in the client computer 12, an instruction is issued from the dedicated program 113 to the management program 4 to establish control mode and the management program 4 is set to control mode (step 106). When the management program 4 is set to control mode, the dedicated program 113 causes the operating system 21 to recognize the user area 106 in the USB memory 8 and places the user area 106 in an available state (step 80 in FIG. 7).

The management program 4 monitors access to the USB memory 8 from the application program. When access is made to the USB memory 8, the management program 4 receives this access (step 108). The management program 4 confirms the type of access (step 108). It is confirmed whether the access made is permitted access (step 110). When the access is permitted access, the user data 3 are read from the USB memory 8 (step 112). The management program 4 decodes the user data 3 which are read from the USB memory 8 (step 114).

The decoded user data 3 are displayed on the output device of the client computer 12 (step 116). When the access made is not permitted access, the management program 4 cancels the access (steps 110 and 120). Here, just as a message to the effect that the access is unpermitted access is displayed on the display, a display can also be made so that the client 11 is able to inspect the display (step 122). The management program 4 continuously monitors the user data 3 thus displayed (step 118). The user data 3 are displayed by starting up a suitable application program 20, depending on the type of data.

For example, the user data 3 are transferred to a text editing application program 20 and displayed in the case of text data. The client 11 operates the application program 20 while operating the keyboard and mouse or another input device and inspects the user data 3. However, the user data 3 cannot be saved by the application program 20. In addition, a newly created file cannot be saved by using the user data 3. The client 11 is only able to inspect the user data 3.

When the user data 3 are edited, this access is suspended, depending on the control mode setting. The recording of the user data 3 to a storage device such as the hard disk 25 or to a recording medium is also suspended. Here, the operation during the control mode of the management program 4 is described here. In control mode, the management program 4 monitors the nature of the functions of the electronic computer and decides on how the data flow is controlled. When control mode is ON, this signifies a state where the management program 4 monitors the electronic computer and restricts some of the functions of the electronic computer. When control mode is OFF, this signifies a state where the management program 4 is operating on the electronic computer but does not particularly restrict the functions of the electronic computer.

FIG. 9 is a flowchart which shows the operation when the management program 4 turns ON control mode. As shown in step 78 of FIG. 7 and step 106 of FIG. 8, the management program 4 turns ON the control mode (step 130). Here, the management program 4 prohibits the writing to the hard disk 25 which is built into the client computer 12 (step 131). In addition, the management program 4 prohibits writing to removable drives (step 132).

The removable drives also include the USB memory 8. Hence, when data are to be written to the USB memory 8 from the application program 20 or operating system 21, the driverware 50 senses this fact and suspends the write operation. When there is a recording device in addition to the USB memory 8 and the built-in hard disk, writing to the recording device is prohibited (step 134). For example, recording devices include removable drives, flexible disk drives, and external hard disks, and so forth. The management program 4 also prohibits the usage of network communications (step 136).

For example, the usage of network communications includes access to the Internet, a LAN or the like, and communication between computers via network card 23. The usage of an interface other than that of the USB memory 8 is prohibited. For example, the usage of USB, SCSI, IDE, and RS-232C-based interfaces is prohibited (step 138). In addition, the management program 4 prohibits copy & paste, clipboard usage, and the network function (step 139). Furthermore, the management program 4 also prohibits the usage of screen capture (step 139).

The management program 4 designates the process required for the normal operation of the operating system 21 and makes exception settings (step 140). For example, the system or the like required for the operation of the operating system 21 can be run. The management program 4 acquires the process name and process ID of the process that has started up (step 142). The management program 4 saves the acquired process name and process ID in the management table (step 144). The various settings of the steps 131 to 140 after the management program 4 has turned ON the control mode need not necessarily be performed in that order and can be freely combined depending on the situation.

When the USB memory 8 is removed from the client computer 12, the operating system 21 senses that the USB memory 8 has been removed. The USB memory 8 is recognized by the operating system 21 as a removable driver and, therefore, the management program 4 performs a check of whether the USB memory 8 is the USB memory 8 in which the dedicated program 113 is stored. When the USB memory 8 is disconnected, the management program 4 cancels all of the settings that were set in steps 131 to 140. The settings of the automatic decoding of files are also canceled.

Figure 10:
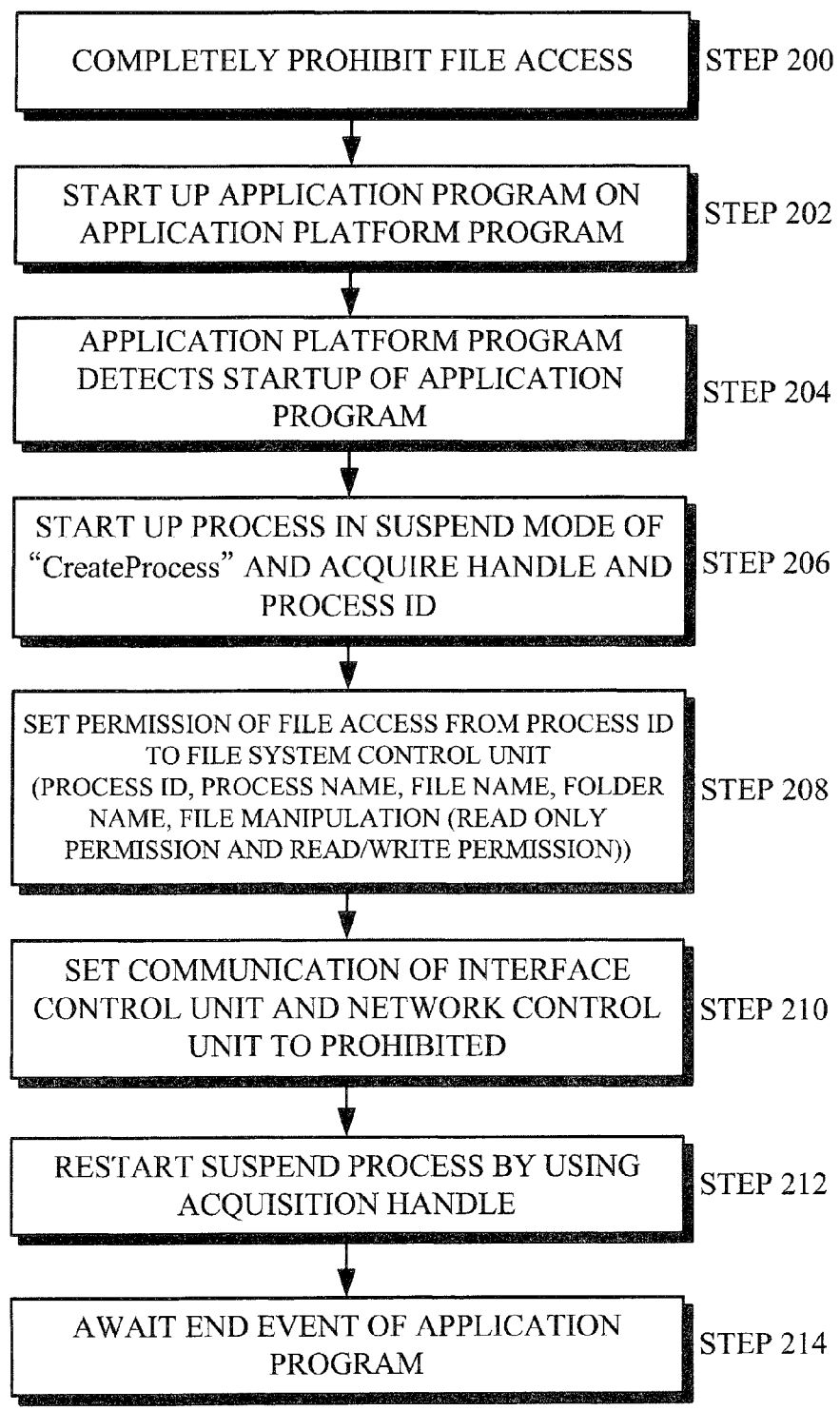
FIG. 10 is a flowchart which shows the operation of the control unit 52.

FIG. 10 illustrates the flowchart of the operation of the control unit 52. When the driverware 52 is instructed to turn ON the control mode, the control unit 52 receives this instruction and transmits a command prohibiting all file access (step 200). This command is transmitted to the interface control unit 42, the network control unit 43, and the file system control unit 44. The interface control unit 42, network control unit 43, and file system control unit 44 receive this command and prohibit file access. Furthermore, control processes are set, network usage is prohibited, clipboard usage is prohibited, screen capture usage is prohibited, and the copy and paste function is prohibited, and so forth.

All of the processes executed by the process manager of the executive 16 (See FIG. 2) are managed. Here, process start and end events are acquired by registering the callback function (using the API of kernel 17). The callback function is set for the start and end events of the processes being executed and settings are made so that the start and end of the application program 20 can be detected. When the application platform program 5 is operating, the application program 20 starts up (step 202). The application platform program 5 detects the startup of the application program 20 (step 204). The process of the application program 20 is started up in the "SUSPEND" mode of the "CreateProcess" and the application platform program 5 acquires the handle and process ID of the process.

When the process is started up in the suspend mode of the "CreateProcess", a rest state ensues and the process is not executed until restart. The handle is the process handle returned by the "CreateProcess". The application platform program 5 transmits the handle and process ID thus acquired to the control unit 52. When the process is started up, the application platform program 5 executes the callback function in the file system control unit 44 and reports the start of control to the control unit 52. The control unit 52 acquires the handle and process ID (step 206). The detailed acquisition operation will be described subsequently.

The control unit 52 transmits the handle and process ID to the file system control unit 44 and makes settings permitting file access output by the process ID. The items which are set to permit file access are the process ID, process name, file name, folder name, and file manipulation. The settings designated for the file manipulation are settings permitting either "Read Only" or "Read/Write" (step 208). The interface control unit 42 makes settings to prohibit the usage of the various interfaces (step 210).

In addition, the network control unit 43 makes settings prohibiting network communication (step 210). When this series of settings ends, the acquired handle is used to restart the suspend process (step 212). The application program 20 is run. Furthermore, the control unit 52 awaits the end event which is the report issued by the operating system 21 when the application program 20 ends (step 214). When the application program 20 ends, the callback function in the file system control unit 44 is executed and the cancellation of control is reported to the control unit 52.

Figure 11:
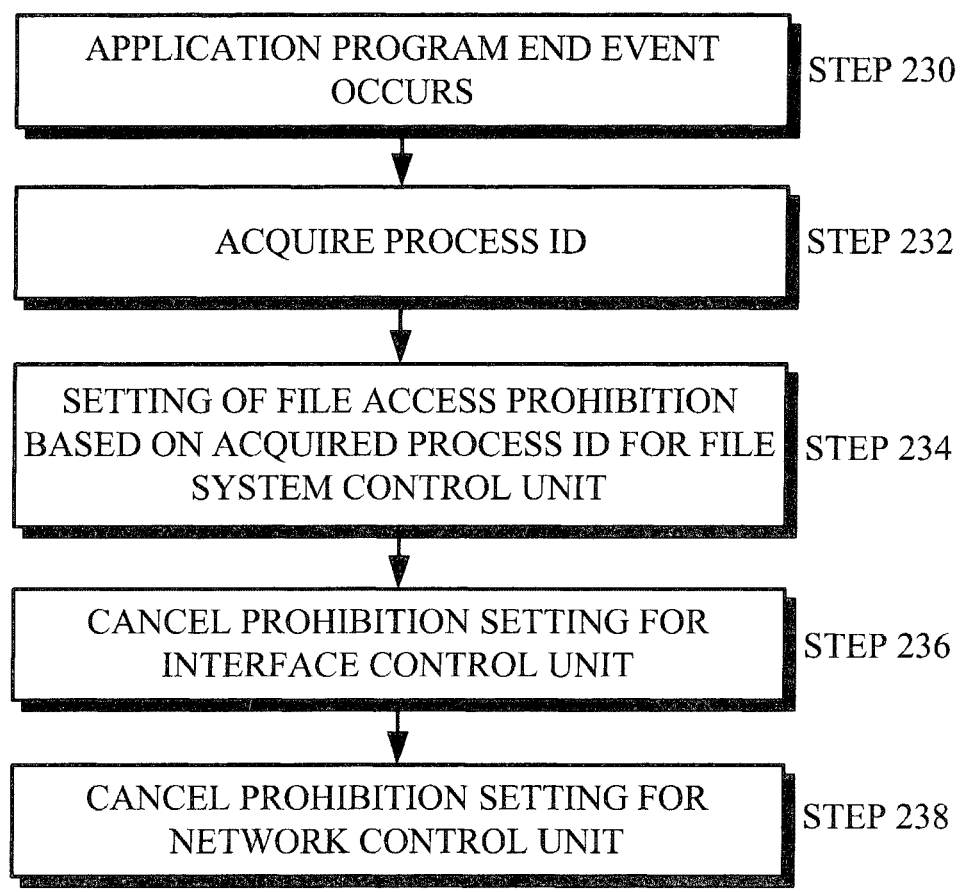
FIG. 11 is a flowchart which shows the operation of the control unit 52 when the application program 20 ends.

The file system control unit 44 cancels the control that has been executed by the process control list 150 and subsequently does not perform control of the application program 20. Naturally, when the application program 20 accesses the user data, control is restarted. FIG. 11 is a flowchart which shows the operation of the control unit 52 when the application program 20 ends. The application program 20 runs and, when the application program 20 ends, an end event is produced (step 230). The application platform program 5 acquires the process ID of the end event.

The application platform program 5 transmits the process ID of the end event to the control unit 52. The control unit 52 acquires the process ID of the end event (step 232). The control unit 52 makes settings with respect to the file system control unit 44 to prohibit file access using the acquired process ID (step 234). The control unit 52 then issues an instruction to cancel the prohibition setting to the interface control unit 42 and the interface control unit 42 cancels the usage prohibition setting (step 236). An instruction to cancel the prohibition setting is issued to the network control unit 43 and the usage prohibition setting is canceled by the network control unit 43 (step 238).

Figure 12:
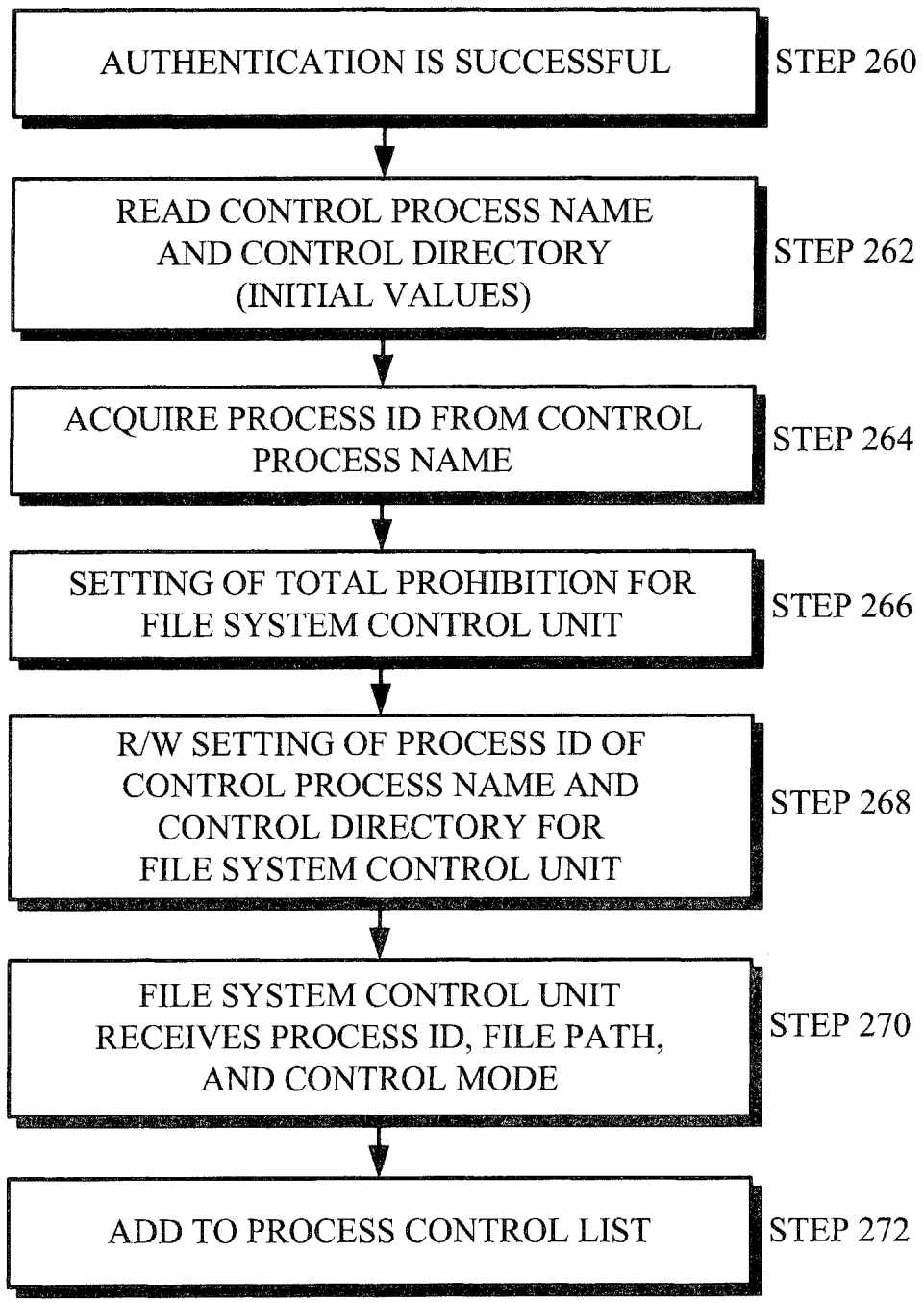
FIG. 12 is a flowchart which shows the flow when the control unit 52 sets usage prohibition exclusions.

FIG. 12 shows a flowchart for when the control unit 52 sets a usage prohibition exception. Authentication is successful (step 260). When authentication is successful, it is necessary to designate the processes which are indispensable to the running of the operating system 21 and to prevent restrictions of any kind on these processes. For example, usage of the system service-related execution files of the operating system 21 and of the processes when the execution files are running is prohibited and, when it has not been possible to start up the execution files, the services provided by the operating system 21 can be hindered and the running of the operating system 21 itself becomes unstable.

Figure 14:
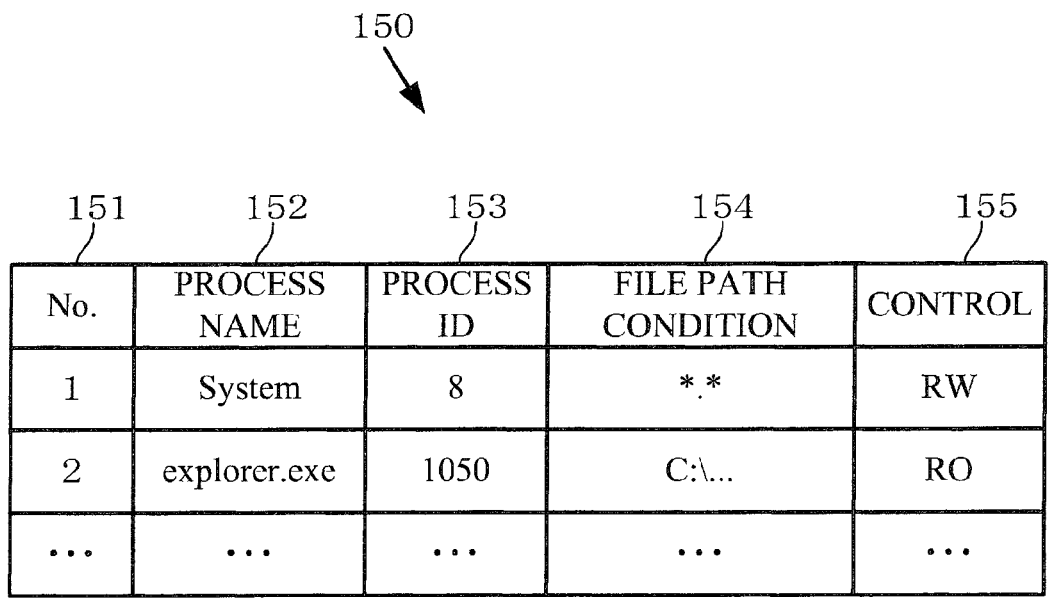
FIG. 14 shows an example of a process control list 150.

It is therefore necessary to permit the running of the minimum execution files and processes required for the running of the operating system 21 without restriction. For example, examples of such processes can include "System", "Kernel.exe", and "explorer.exe". The control process name and control directory are registered in the process control list 150. The process control list 150 is illustrated in FIG. 14. The control unit 52 reads the control process names and control directory from the process control list 150 (step 262).

There are also application programs which do not save and run temporary files on a local disk. In this case, encryption is performed when an application program creates temporary files on the local disk and process protection is carried out so that temporary files cannot be accessed by another application program. Process protection is performed by means of driverware by prohibiting file access by a process of an application program other than the application program being controlled. The temporary files are deleted when the running of the application program has ended.

The control unit 52 acquires the process ID from the control process name (step 264). The actual program (an .exe module or other module) name is judged from the process ID. Further, the control unit 52 indicates all the prohibition settings to the file system control unit 44 and the file system control unit 44 sets prohibitions for all of the processes (step 266). The control unit 52 then indicates the process ID of the control process name and the read/write permission setting for the control directory to the file system control unit 44 (step 268).

The file system control unit 44 receives the process ID, file path, and control mode that have been sent by the control unit 52 (step 270). The file system control unit 44 adds the process ID, file path, and control mode to the process control list 150 (step 272).

Figure 13:
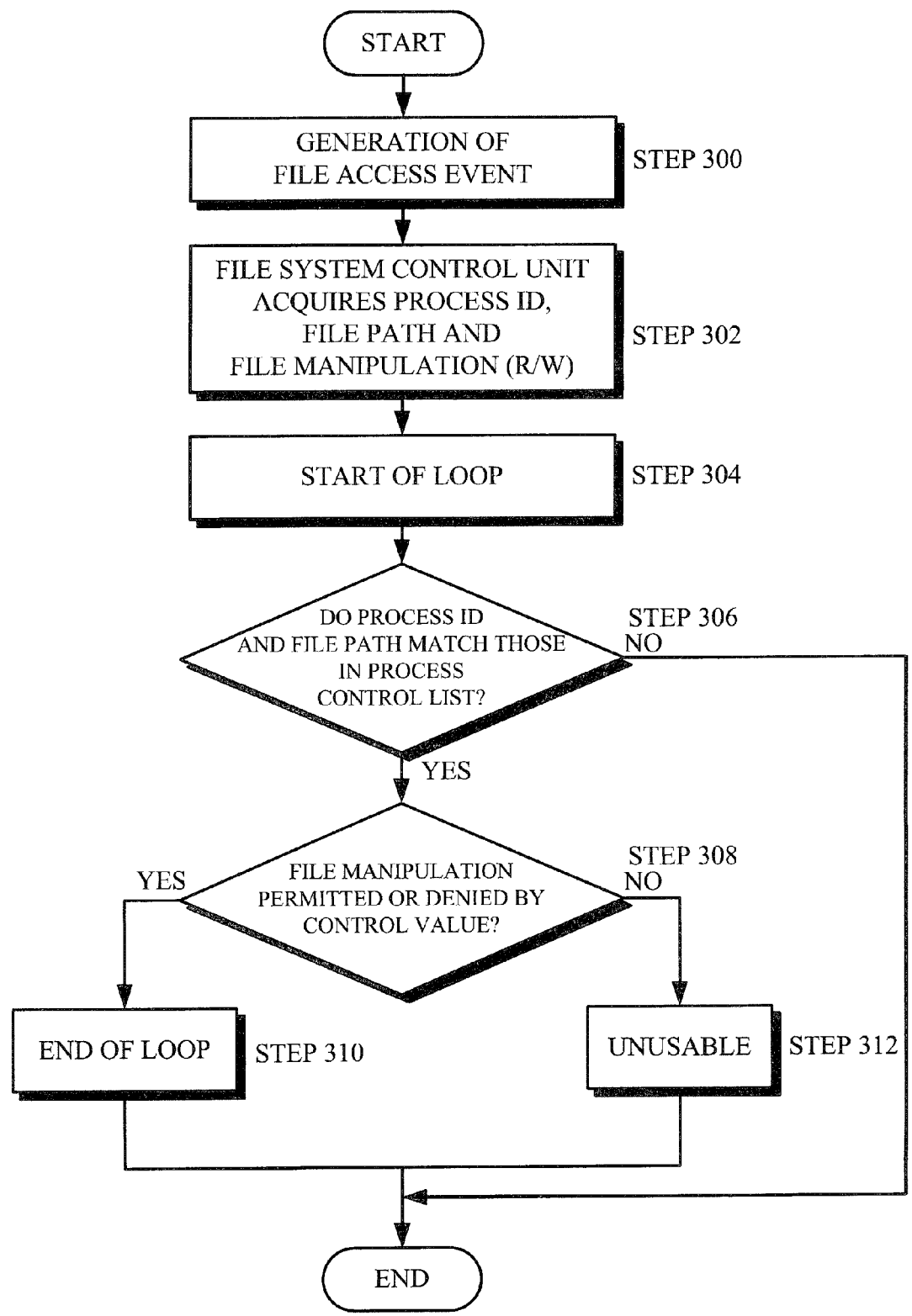
FIG. 13 is a processing flowchart which shows the operation of the file system control unit 44.

FIG. 13 is a processing flowchart which shows the operation of the file system control unit 34. A file access event occurs when a file is accessed by the application program 20 or operating system 21 (step 300). The file system control unit 44 acquires the process ID, file path, and file manipulation (Read/Write) from the control unit 52 (step 302). The file system control unit 44 checks whether the process ID and file path match those registered in the process control list 150 (steps 304 to 310).

When the process ID and file path match those registered in the process control list 150, a setting is made to permit or deny the manipulation of files by means of a control value (step 308). When the process ID and file path do not match those registered in the process control list 150, the manipulation of files is set to prohibited by means of a control value (step 312).

FIG. 14 shows an example of the process control list 150. The process control list 150 is stored in a file for the initial values when the management program 4 is installed and saved in the hard disk 25. The process control list 150 can also be edited and modified when necessary. The process control list 150 includes a serial number field 151 which indicates the ranking order of registration, and fields for a process name 152 which indicates the process name of the control target, a process ID 153 which indicates the process ID of the control target, a file path 154 which indicates the file path, and a control 155 which indicates the method of control. The process name of the control target is mentioned as the control process in one part of the above description.

Further Embodiment of Internal Structure of USB Memory 8

Figure 15:
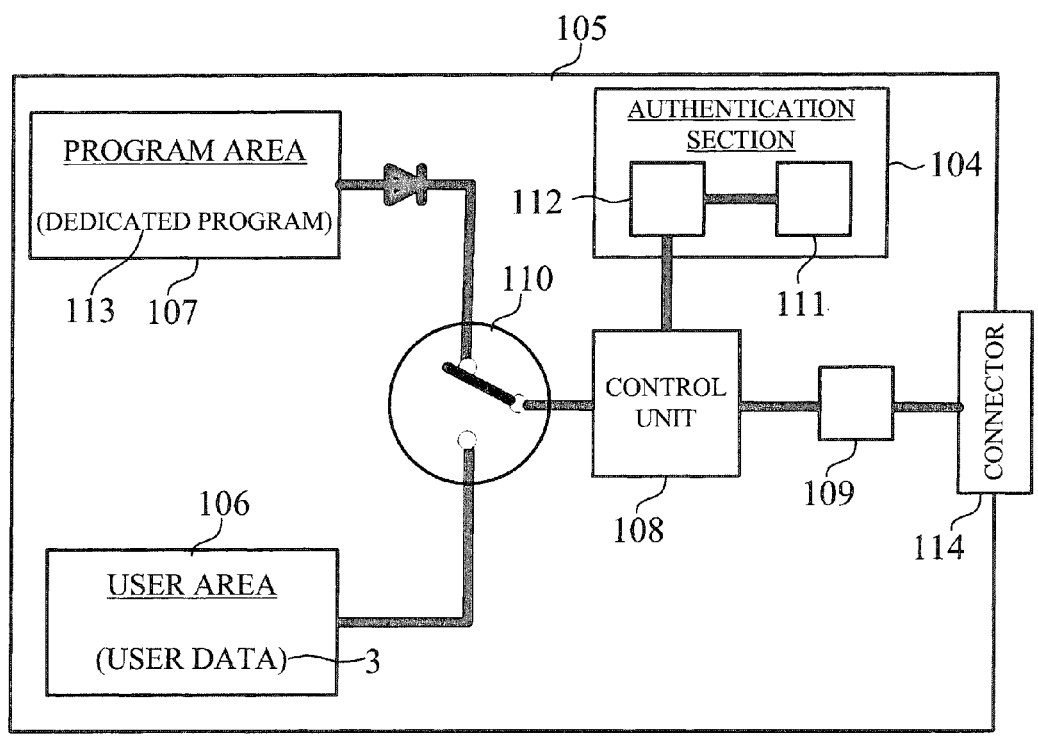
FIG. 15 is a block diagram which shows another embodiment of an internal structure in the USB memory 8.

FIG. 15 is a block diagram which shows another embodiment of the internal structure of the USB memory 8. FIG. 15 provides an outline of the constitution of the substrate 105 stored in an enclosure (not shown). The user area 106, program area 107, USB (Universal Serial Bus) controller 109, and central processing unit (CPU) 108 and so forth are arranged mounted on the substrate 105. The user area 106 is a memory for storing the user data 3. The program area 107 is a memory for storing the dedicated program 113.

A USB controller 9 is a program for controlling transmission and receipt to and from an electronic computer (not shown) via the connector 114. The connector 114 is a connector for connecting the USB memory 8 to the client computer 12. The central processing unit 108 is a central processing unit for controlling the whole USB memory 8. The technology for the authentication section 104 and fingerprint information recognition method or the like is widely known technology. Since this technology does not constitute the spirit of the invention, a detailed description thereof will be omitted.

The user data 3 and dedicated program 113 are stored in the user area 106 and program area 107 which are separate memory areas of the USB memory 8. These two memory areas are designed so that same cannot be accessed simultaneously by the electronic computer. A switch 110 is controlled with software by means of the central processing unit 108 and serves to control access to the user area 106 and program area 107 by the client computer 12.

When the USB memory 8 is connected to the client computer 12 and the dedicated program 113 runs on the client computer 12, the switch 110 switches from the program area 107 to the user area 106 and the user data 3 can be sent and received. Furthermore, an authentication database 111 and an authentication module 112 are disposed on the substrate 105.

The authentication module 112 performs user authentication. The authentication database 111 is a memory for a database which stores fingerprint information for the user who is able to use the client computer 12 and identification data such as a password.

Acquisition of Process Name, Process ID, and File Name

In order to detect the process, the following pre-processing is carried out. The callback of a file-access-related I/O function request ('I/O request' hereinbelow) in the file system control unit 44 is set to return to the control unit 52. This is because all of the file-access-related I/O requests pass through the file system control unit 44 and the I/O requests are therefore transferred to the control unit 52 and analyzed. The process control list 150 is then transferred to the file system control unit 44 and the file system control unit 44 monitors whether the access registered in the process control list 150 has been carried out.

The following execution processing is performed in order to detect the process. Suppose that the application program 20 is to access a file which is stored in the USB memory 8. Here, the application program 20 issues an I/O request relating to file access. As per the settings during the earlier pre-processing, this I/O request is called back and transmitted to the control unit 52. Once the callback of the I/O request is received by the control unit 52, the process ID, process name, and file name are acquired. The process-related process name, process ID, and file name are then acquired as follows.

In order to acquire the process name, the "ZwQueryInformationProcess" function is employed, the image path of the execution process is acquired, and the process name is acquired from the file name of the execution file "exe". In order to acquire the process ID, the function "PsGetCurrentProcessId ( )" is used to acquire the current process ID. In order to acquire the file name, the file name is acquired from the file object referenced by the I/O request (IRP) relating to the file I/O request.

The file system control unit 44 then receives the I/O request-related process name, process ID, and file name from the control unit 52, compares same with the process control list 150, and performs file access control. The file system control unit 44 returns permission or rejection of access to the file in response to the I/O request in accordance with the process control list 150 to the application program 20.

Event Detection

Event detection is performed as follows. The I/O request in the kernel of the operating system 21 is made using the IRP (IO Request Packet) format. The IRP shown in Table 1 below is utilized for file access. Event detection is carried out by setting the callback function with the IRP as the target. The callback function is registered in the process manager of the executive 16 (See FIG. 2) and control is transferred to the reference destination driverware 50 when the callback function is executed.

TABLE 1

File access-related IRP list:
IRP_MJ_CREATE
IRP_MJ_CREATE_NAMED_PIPE
IRP_MJ_CLOSE
IRP_MJ_READ
IRP_MJ_WRITE
IRP_MJ_QUERY_INFORMATION
IRP_MJ_SET_INFORMATION
IRP_MJ_QUERY_EA
IRP_MJ_SET_EA
IRP_MJ_FLUSH_BUFFERS
IRP_MJ_QUERY_VOLUME_INFORMATION TABLE 1-continued IRP_MJ_SET_VOLUME_INFORMATION
IRP_MJ_DIRECTORY_CONTROL
IRP_MJ_FILE_SYSTEM_CONTROL
IRP_MJ_DEVICE_CONTROL
IRP_MJ_INTERNAL_DEVICE_CONTROL
IRP_MJ_SHUTDOWN
IRP_MJ_LOCK_CONTROL
IRP_MJ_CLEANUP
IRP_MJ_CREATE_MAILSLOT
IRP_MJ_QUERY_SECURITY
IRP_MJ_SET_SECURITY
IRP_MJ_POWER
IRP_MJ_SYSTEM_CONTROL
IRP_MJ_DEVICE_CHANGE
IRP_MJ_QUERY_QUOTA
IRP_MJ_SET_QUOTA
IRP_MJ_PNP The management program 4 of the present invention makes it possible to perform control by restricting the target to only the application program 20 which is to access the USB memory 8 storing the user data 3 and the process thereof. Control is exercised by monitoring attempts to access only the user data 3 and by permitting or denying this access without forcibly restricting the services of the other application programs 20 and the operating system 21 running on the client computer 12.

Furthermore, the network function of the program 20 which have accessed to the user data 3 and the process thereof are interrupted, and the usage of functions such as clipboard that are likely to copy the user data 3 is prohibited.

INDUSTRIAL APPLICABILITY

The present invention makes it possible to record user files, data, and programs and so forth onto electronic recording media to be provided to external clients, and grasp how they are used by the clients. The present invention may be utilized in fields requiring the strict management of electronic data. More particularly, the present invention is desirably utilized in the printing industry, insurance companies and stores requiring management of confidential information such as user data and files which is business or accounts data or the like, and requiring employee data management. Furthermore, the present invention may be utilized in the fields of financial institutions and nuclear power-related establishments which require the strict management of electronic data, or terminals handling personal data.

The invention claimed is:

1. An electronic computer having stored thereon a data management program having a driverware program which operates in a kernel mode in which all commands of an operating system operating the electronic computer are executed and which serves to provide a common interface for communications between device drivers for directly controlling devices connected to the electronic computer or for communications between the device drivers and an application program running on the electronic computer, comprises:

a central processor unit;
a memory;
the driverware program, comprising:
an application program interface code that receives first data including commands and data which are output by the application program and transmits second data including a result of executing the commands and reception data which are received from the device drivers to the application program;

a device driver control code that transmits third data including the commands and the data to the device drivers and receives fourth data including the result of executing the commands and the reception data from the device drivers; and a control code that processes the first data and the fourth data, generates the second data and the third data, and controls the first to fourth data, wherein the driverware program causes the electronic computer to execute steps of:

reading a process control list stored in an external storage device which is built into or connected to the electronic computer, the process control list determining whether to permit or deny the reading of an execution file of the application program or a process of the execution file from the external storage device, or writing of the execution file or the process to the external storage device;

detecting connection of a storage device storing user data when the storage device is connected to the electronic computer;

turning ON a control mode by making settings to deny all access to read from the external storage device comprising the storage device or write to the external storage device;

monitoring the access;

receiving, when the application program starts up, one or more control data selected from among a file name of the execution file, a file path of the execution file, a process name of the process, and a process ID of the process;

comparing the acquired control data with values of the process control list;

granting permission in accordance with the process control list in cases where the control data match the values of the process control list in the comparison step, and denying permission in cases where the control data do not match the values of the process control list;

wherein the data management program further comprises an application platform program which runs in a user mode of the operating system and which serves to provide a user interface with a file system of the operating system, and the application platform program causes the electronic computer to execute steps of:

a step of causing the process to operate in a suspend mode;

acquiring a handle of the process operating in the suspend mode, the process name, and the process ID; and transmitting the process name and the process ID to the application program interface code, wherein the device driver control code further includes a file system control code that controls the file system of the operating system, the file system control code receives an access request for the access by the application program to the external storage device and transmits the received access request to the control code, the control further receives the access request, acquires the control data from the access request, and transmits the acquired control data to the file system control code, and the file system control code further receives the control data transmitted by the control code, compares the received control data with values of the process control list, permits the access in accordance with the process control list in cases where the control data match the values of the process control list, and denies the access in cases where the control data do not match the values of the process control list;

wherein the driverware program further includes an interface control code that controls a physical connector interface driver of the electronic computer and a network control code that controls a network driver; and wherein the control code awaits an end event of the application program, acquires the process ID when the end event has occurred, sets a prohibition for file access based on the process having the process ID by the file system control code, cancels a communication prohibition setting for the interface control code, and cancels a communication prohibition setting for the network control code.

2. The electronic computer according to claim 1, wherein the driverware program executes the steps of:

reading the user data from the storage device;

decoding the user data; and transferring the user data to the application program.

3. The electronic computer according to claim 1, wherein the turning on the control mode step comprises one or more steps selected from the group consisting of:

prohibiting writing to the external storage device;

prohibiting writing to a removable drive which is connected to the electronic computer;

prohibiting the usage of one or more communication ports selected from the group consisting of RS-232C, Infrared Data Association (IrDA), Universal Serial Bus (USB), and IEEE1394 which are serial interfaces for a serial transfer system and IEEE1284, Small Computer System Interface (SCSI), and Integrated Drive Electronics (IDE) which are parallel interfaces for a parallel transfer system;

prohibiting a copy and paste function;

prohibiting usage of screen capture;

prohibiting usage of a clipboard; and prohibiting a network function.

4. The electronic computer according to claim 1, wherein the driverware program executes the step of:

turning the control mode OFF by completely canceling all the settings made in the control mode when the storage device is disconnected from the electronic computer.

5. The electronic computer according to claim 1, wherein the storage device comprises a user area which is an area for storing the user data and which permits reading and writing, and a program area which is an area for storing a program and is dedicated to reading, when the storage device is connected to the electronic computer, the dedicated program stored in the program area executes steps of:

starting up automatically, confirming the driverware, after confirming the driverware, transmitting a command to turn ON the control mode of the driverware to the driverware, and when the control mode is ON, the dedicated program causes the operating system to recognize the user area so that the user data can be accessed by the electronic computer.

6. The electronic computer according to claim 5, wherein the storage device comprises an authentication program for performing personal authentication of a client utilizing the storage device.

7. The electronic computer according to claim 1, wherein the driverware program includes encryption code for encrypting the user data and decoding code for decoding the encrypted user data.

8. The electronic computer according to claim 1, wherein the driverware program includes a log acquisition code.

9. A non-transitory computer readable recording medium having stored thereon a data management program and a driverware program for an electronic computer, the driverware program which operates in a kernel mode in which all commands of an operating system operating the electronic computer are executed and which serves to provide a common interface for communications between device drivers for directly controlling devices connected to the electronic computer or for communications between the device drivers and an application program running on the electronic computer, the driverware program, further comprising:
 an application program interface code that receives first data including commands and data which are output by the application program and transmits second data including a result of executing the commands and reception data which are received from the device drivers to the application program;
 a device driver control code that transmits third data including the commands and the data to the device drivers and receives fourth data including the result of executing the commands and the reception data from the device drivers; and
 a control code that processes the first data and the fourth data, generates the second data and the third data, and controls the first to fourth data,
 wherein the driverware program causes the electronic computer to execute steps of:
  reading a process control list stored in an external storage device which is built into or connected to the electronic computer, the process control list determining whether to permit or deny the reading of an execution file of the application program or a process of the execution file from the external storage device or writing of the execution file or the process to the external storage device;
  detecting connection of a storage device storing user data when the storage device is connected to the electronic computer;
  turning ON a control mode by making settings to deny all access to read from the external storage device comprising the storage device or write to the external storage device;
  monitoring the access;
  receiving, when the application program starts up, one or more control data selected from among a file name of the execution file, a file path of the execution file, a process name of the process, and a process ID of the process;
  comparing the acquired control data with values of the process control list;
  granting permission in accordance with the process control list in cases where the control data match the values of the process control list in the comparison step, and denying permission in cases where the control data do not match the values of the process control list;
 wherein the data management program further comprises an application platform program which runs in a user mode of the operating system and which serves to provide a user interface with a file system of the operating system, and
 the application platform program causes the electronic computer to execute steps of:
  causing the process to operate in a suspend mode;
  acquiring a handle of the process operating in the suspend mode, the process name, and the process ID; and
  transmitting the process name and the process ID to the application program interface code,
 wherein the device driver control code further includes a file system control code that controls the file system of the operating system,
 the file system control code receives an access request for the access by the application program to the external storage device and transmits the received access request to the control code,
 the control code further receives the access request, acquires the control data from the access request, and transmits the acquired control data to the file system control code, and
 the file system control code further receives the control data transmitted by the control code, compares the received control data with values of the process control list, permits the access in accordance with the process control list in cases where the control data match the values of the process control list, and denies the access in cases where the control data do not match the values of the process control list;
 wherein the driverware program further includes an interface control code that controls a physical connector interface driver of the electronic computer and a network control code that controls a network driver; and
 wherein the control code awaits an end event of the application program, acquires the process ID when the end event has occurred, sets a prohibition for file access based on the process having the process ID by the file system control code, cancels a communication prohibition setting for the interface control code, and cancels a communication prohibition setting for the network control code.

10. The non-transitory computer readable recording medium according to claim 9, wherein the driverware program executes the steps of:
 reading the user data from the storage device;
 decoding the user data; and
 transferring the user data to the application program.

11. The non-transitory computer readable recording medium according to claim 9, wherein the turning on the control mode step comprises one or more selected from the group consisting of:
 prohibiting writing to the external storage device;
 prohibiting writing to a removable drive which is connected to the electronic computer;
 prohibiting the usage of one or more communication ports selected from the group consisting of RS-232C, Infrared Data Association (IrDA), Universal Serial Bus (USB), and IEEE1394 which are serial interfaces for a serial transfer system and IEEE1284, Small Computer System Interface (SCSI), and Integrated Drive Electronics (IDE) which are parallel interfaces for a parallel transfer system;
 prohibiting a copy and paste function;
 prohibiting usage of screen capture;
 prohibiting usage of a clipboard; and
 prohibiting a network function.

12. The non-transitory computer readable recording medium according to claim 9, wherein the driverware program executes the step of:
 turning the control mode OFF by completely canceling all the settings made in the control mode when the storage device is disconnected from the electronic computer.

13. The non-transitory computer readable recording medium according to claim 9, wherein the storage device comprises a user area which is an area for storing the user data and which permits reading and writing, and a program area which is an area for storing a program and is dedicated to reading, when the storage device is connected to the electronic computer, the dedicated program stored in the program area executes steps of:

starting up automatically, confirming the driverware, after confirming the driverware, transmitting a command to turn ON the control mode of the driverware to the driverware, and when the control mode is ON, the dedicated program causes the operating system to recognize the user area so that the user data can be accessed by the electronic computer.

14. The non-transitory computer readable recording medium according to claim 13, wherein the storage device comprises an authentication program for performing personal authentication of a client utilizing the storage device.

15. The non-transitory computer readable recording medium according to claim 9, wherein the driverware program includes encryption code for encrypting the user data and decoding code for decoding the encrypted user data.

16. The non-transitory computer readable recording medium according to claim 9, wherein the driverware program includes a log acquisition code.

* * * * *